US006922696B1

(12) United States Patent
Lincoln et al.

(10) Patent No.: US 6,922,696 B1
(45) Date of Patent: Jul. 26, 2005

(54) LATTICE-BASED SECURITY CLASSIFICATION SYSTEM AND METHOD

(75) Inventors: Patrick D. Lincoln, Woodside, CA (US); Steven M. Dawson, Menlo Park, CA (US); Pierangela Samarati, Brembio (IT); Sabrina De Capitani di Vimercati, Cologno Monzese (IT)

(73) Assignee: SRI International, Menlo Park, CA (US)

( * ) Notice: Subject to any disclaimer, the term of this patent is extended or adjusted under 35 U.S.C. 154(b) by 993 days.

(21) Appl. No.: 09/711,152

(22) Filed: Nov. 9, 2000

Related U.S. Application Data
(60) Provisional application No. 60/209,853, filed on May 31, 2000.

(51) Int. Cl.[7] ............................................... G06F 17/00
(52) U.S. Cl. ........................... 707/101; 707/9; 707/102; 712/200; 713/200
(58) Field of Search .................... 707/1–10, 100–104.1, 707/200–206; 713/200–202; 712/200–201

(56) References Cited

PUBLICATIONS

Theory and applications of attribute decomposition Rokach, L.; Mainon, O.; Data Mining, 2001. ICDM 2001, Proceedings IEEE International Conference on Nov. 29–Dec. 2, 2001.*
The research on the classification of the incomplete information system Zhang Min; Jia–Xing Cheng; Hong–Jun Wang; Machine Learning and Cybernetics, 2004. Proceedings of 2004 International Conference on, vol.: 6, Aug. 26–29, 2004.*

Evolutionary automated classification Luchian, S.; Luchian, H.; Petriuc, M.; Evolutionary Computation, 1994. IEEE World Congress on Computational Intelligence., Proceedings of the First IEEE.* http://www.intsci.ac.cn/shizz/pub/2002/icmla–hsc.pdf, He et al., The Multi–class Classification Method in Large Database Based on Hyper Surface.* http://www.cs/okstate.edu/~jonyer/pub/flairs2000.pdf, Joyner et al., "Graph–based Hiierarchical Conceptual Clustering".*

* cited by examiner

Primary Examiner—David Jung
(74) Attorney, Agent, or Firm—DLA Piper Rudnick Gray Cary US LLP

(57) ABSTRACT

Despite advances in recent years in the area of mandatory access control in database systems, today's information repositories remain vulnerable to inference and data association attacks that can result in serious information leakage. Without support for coping against these attacks, sensitive information can be put at risk because of release of other (less sensitive) related information. The ability to protect information disclosure against such improper leakage would be of great benefit to governmental, public, and private institutions, which are, today more than ever, required to make portions of their data available for external release. In accordance with the invention, a solution to the problem of classifying information by enforcing explicit data classification as well as inference and association constraints is provided. We formulate the problem of determining a classification that ensures satisfaction of the constraints, while at the same time guaranteeing that information will not be unnecessarily overclassified.

43 Claims, 8 Drawing Sheets

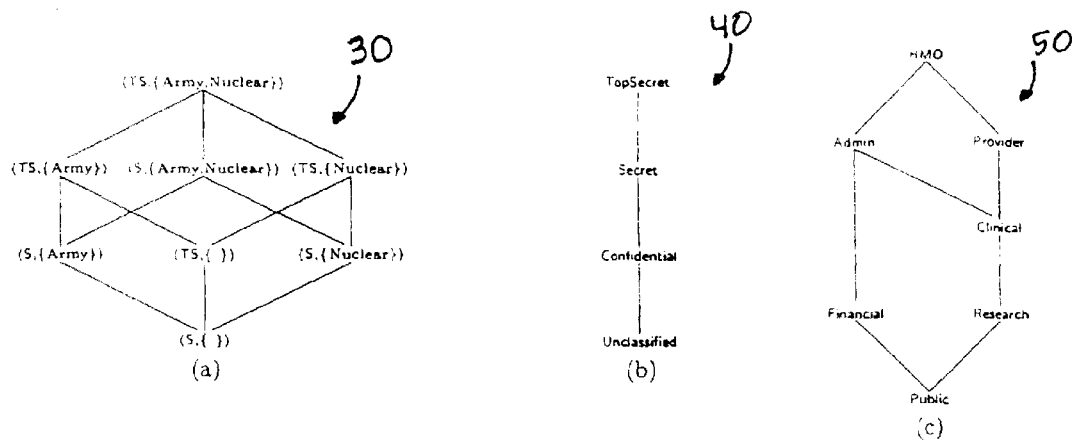
Figure 1: Examples of security lattices.
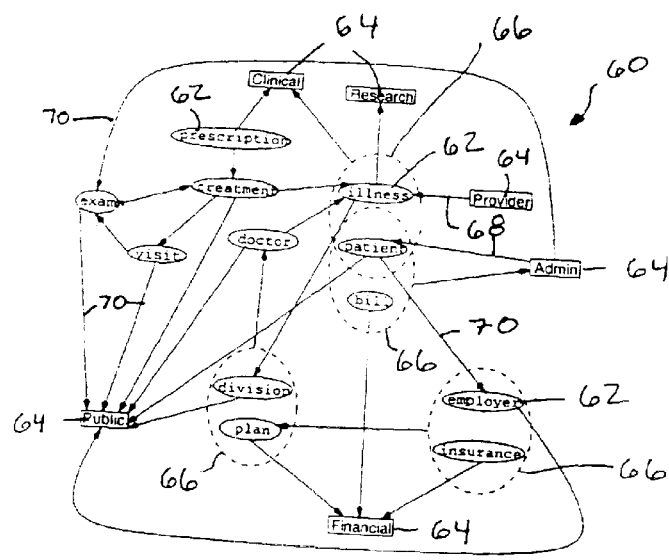
Figure 2: A classification constraint graph

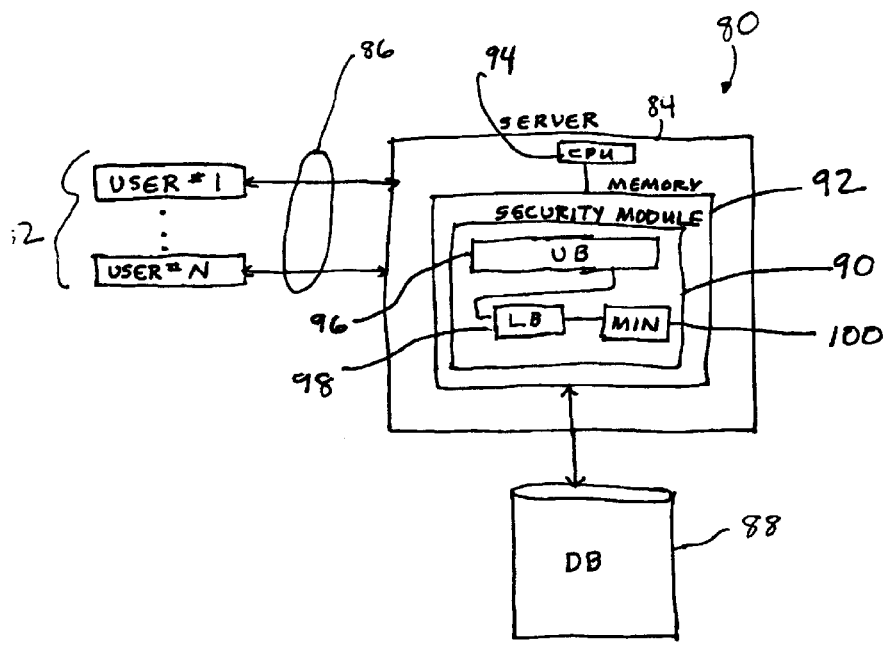
FIGURE 3
Provider ⪰ λ(illness)
λ(illness) ⪰ λ(division)
lub{λ(division), λ(plan)} ⪰ λ(doctor)
λ(illness) ⪰ Research
λ(division) ⪰ Public
λ(plan) ⪰ Financial
λ(doctor) ⪰ Public
Figure 5(a)
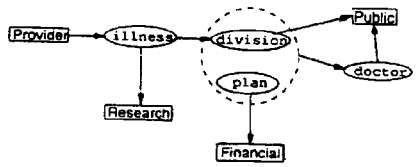
Figure 5(b)
λ(illness) = Provider
λ(division) = Provider
λ(plan) = HMO
λ(doctor) = HMO
Figure 5(c)

λ(illness) ⪰ Research
λ(prescription) ⪰ Clinical
λ(prescription) ⪰ λ(treatment)
λ(treatment) ⪰ Public
λ(treatment) ⪰ λ(visit)
λ(treatment) ⪰ λ(illness)
λ(visit) ⪰ Public

Figure 7(a)

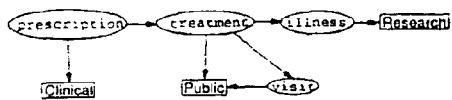

Figure 7(b)

λ(illness) = Research
λ(prescription) = Clinical
λ(treatment) = Research
λ(visit) = Public

Figure 7(c)

λ(patient) ⪰ Public
λ(bill) ⪰ Financial
lub{λ(patient), λ(bill)} ⪰ Admin

Figure 8(a)

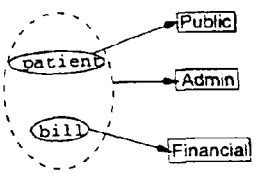

Figure 8(b)

λ(bill) = Admin
λ(patient) = Public

Figure 8(c)

λ(bill) = Financial
λ(patient) = Research

Figure 8(d)

λ(division) ⪰ Public
lub{λ(division), λ(plan)} ⪰ λ(doctor)
λ(doctor) ⪰ Public
λ(doctor) ⪰ λ(illness)
λ(illness) ⪰ λ(division)
λ(illness) ⪰ Research
λ(plan) ⪰ Financial

Figure 9(a)

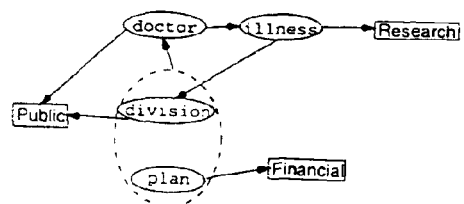

Figure 9(b)

λ(division) = Public
λ(doctor) = Research
λ(illness) = Research
λ(plan) = Admin

Figure 9(c)

Algorithm 3.1 (Minimal Classification Generation)

```
MAIN
For A ∈ 𝒜 do Constr[A] := ∅; visit[A] := 0; done[A] := FALSE
For l ∈ L do done[l] := TRUE; visit[l] := 1
For c=(lhs,rhs) ∈ C_lower do
    count[c] := 0
    For A ∈ lhs do
        Constr[A] := Constr[A] ∪ {c}; count[c] := count[c] + 1
Stack := ∅
For A ∈ 𝒜 do
    If visit[A] = 0 then dfs_visit(A)
max_scc := 0
For i = 1, ..., |𝒜| do scc[i] := ⟨⟩
For A ∈ 𝒜 do visit[A] := 0
While NOTEMPTY(Stack) do
    A := POP(Stack)
    If visit[A] = 0 then
        max_scc := max_scc + 1
        scc[max_scc] := ⟨A⟩
        dfs_back_visit(A)
For A ∈ 𝒜 do λ(A) := ⊤; visit[A] := 0
compute_upper_bounds
compute_partial_lubs
compute_minimal_solution COMPUTE_UPPER_BOUNDS
For (l, A) ∈ C_upper do λ(A) := λ(A) ⊓ l
For i := 1, ..., max_scc do
    For A ∈ scc[i] do
        If visit[A] = 0 then upper_bound(A, i)

UPPER_BOUND(A, i)
visit[A] := 1
For c = (lhs, rhs) ∈ Constr[A] do
    If count[c] > 0 then count[c] := count[c] − 1
    If count[c] = 0 or rhs ∈ scc[i] then
        levlhs := ⊥
        For A' ∈ lhs do levlhs := levlhs ⊔ λ(A')
        If ¬(levlhs ⪰ λ(rhs)) then
            If rhs ∈ L then Fail
            else λ(rhs) := λ(rhs) ⊓ levlhs
                If rhs ∈ scc[i] then
                    upper_bound(rhs, i)

COMPUTE_MINIMAL_SOLUTION
For i := max_scc, ..., 1 do
    For A ∈ scc[i] do
        done[A] := TRUE; l := ⊥
        For c=(lhs,rhs) ∈ Constr[A] do
            If done[rhs] then
                case |lhs| of
                    1: l := l ⊔ λ(rhs)
                    >1: l := l ⊔ minlevel(A, c)
            else done[A] := FALSE
        If done[A] then λ(A) := l
        else DSet := {l' | l' is a maximal level, λ(A)≻l' ⪰ l}
            While DSet ≠ ∅
                Choose l'' in DSet; DSet := DSet − l''
                Lower := try_to_lower(A, l'')
                If Lower ≠ ∅ then
                    For (A',l') ∈ Lower do λ(A') := l'
                    DSet := {l' | l' maximal level, λ(A)≻l' ⪰ l}
            done[A] := TRUE
    For c ∈ Constr[A] do
        j := count[c]; Plub[c][j] := λ(A) ⊔ Plub[c][j + 1]
        count[c] := count[c] − 1
```

```
DFS_VISIT(A)
visit[A] := 1
For (lhs, rhs) ∈ Constr[A] do
    If visit[rhs] = 0 then dfs_visit(rhs)
PUSH(A, Stack)

DFS_BACK_VISIT(A)
/* Traverses the constraints backward and inserts all
   attributes found in the same SCC list as A */
visit[A] := 1
For (lhs, A) ∈ C_lower do
    For A' ∈ lhs do
        If visit[A'] = 0 then
            scc[max_scc] := concat(⟨A'⟩, scc[max_scc])
            dfs_back_visit(A')

COMPUTE_PARTIAL_LUBS
For c=(lhs,rhs) ∈ C_lower do count[c] := 0; Plub[c][0] := ⊥
For i := 1, ..., max_scc do
    For A ∈ reverse(scc[i]) do
        For c = (lhs, rhs) ∈ Constr[A] do
            count[c] := count[c] + 1; j := count[c]
            Plub[c][j] := Plub[c][j − 1] ⊔ λ(A)
For c=(lhs,rhs) ∈ C_lower do j := count[c] + 1; Plub[c][j] := ⊥

MINLEVEL(A, c)
/* Returns a minimal level for A that keeps c satisfied */
j := count[c]; (lhs, rhs) := c; last := λ(A)
lubothers := Plub[c][j − 1] ⊔ Plub[c][j + 1]
If lubothers ⪰ λ(rhs) then last := ⊥
else Try := {l | l is a maximal level s. t. last≻l}
    While Try ≠ ∅ do
        Choose l in Try; Try := Try − l
        if (l ⊔ lubothers) ⪰ λ(rhs) then
            last := l; Try := {l | l is a maximal level s. t. last≻l}
return last TRY_TO_LOWER(A, l)
Tocheck := {(A, l)}
Tolower := ∅
Repeat
    Choose (A', l') ∈ Tocheck
    Tocheck := Tocheck − {(A', l')}
    Tolower := Tolower ∪ {(A', l')}
    For (lhs, rhs) ∈ Constr[A'] do
        level := ⊥
        For A'' ∈ lhs do
            If ∃(A'', l'') ∈ Tolower then
                level := level ⊔ l''
            else level := level ⊔ λ(A'')
        case done[rhs] of
            TRUE: If ¬(level ⪰ λ(rhs)) then return ∅
            FALSE: If ¬(level ⪰ λ(rhs)) then
                newlevel := λ(rhs) ⊓ level
                If ∃(rhs, l'') ∈ (Tolower ∪ Tocheck) then
                    If ¬(newlevel ⪰ l'') then
                        newlevel := l'' ⊓ newlevel
                        If (rhs, l'') ∈ Tolower then
                            Tolower := Tolower − {(rhs, l'')}
                        else Tocheck := Tocheck − {(rhs, l'')}
                        Tocheck := Tocheck ∪ {(rhs, newlevel)}
                else Tocheck := Tocheck ∪ {(rhs, newlevel)}
until Tocheck = ∅
return Tolower
```

Figure 10 Algorithm for computing a minimal classification.

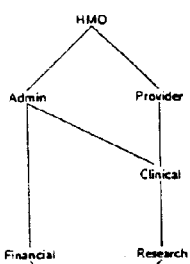
Figure 11 (a)
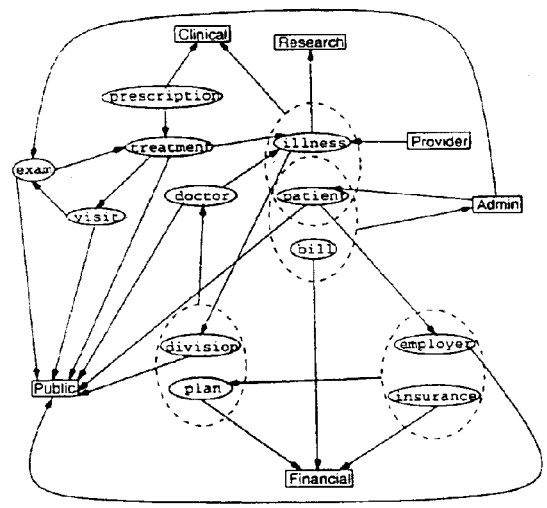
Figure 11 (b)
Figure 11 (c)

(a)  (b)

LATTICE-BASED SECURITY CLASSIFICATION SYSTEM AND METHOD

This Application Claims Priority From Provisional Patent Application Ser. No. 60/209,853 Filed May 31, 2000.

STATEMENT REGARDING FEDERALLY SPONSORED RESEARCH AND DEVELOPMENT

The U.S. Government has a paid-up license in this invention and the right in limited circumstances to require the patent owner to license others on reasonable terms as provided for by the terms of Grants ECS-94-22688 and CCR-9509931 awarded by the National Science Foundation and by the terms of Contract F30602-96-C-0337 awarded by DARPA/Rome Laboratory.

BACKGROUND OF THE INVENTION

This invention relates generally to a system and method for ensuring security of a database system from inference and association attacks.

Information has become the most important and demanded resource. We live in an internetworked society that relies on the dissemination and sharing of information in the private as well as in the public and governmental sectors. This situation is witnessed by a large body of research, and extensive development and use of shared infrastructures based on federated or mediated systems, in which organizations come together to selectively share their data. In addition, governmental, public, and private institutions are increasingly required to make their data electronically available. This often involves large amounts of legacy or historical data, once considered classified or accessible only internally, that must be made partially available to outside interests.

This information sharing and dissemination process is clearly selective. Indeed, if, on the one hand, there is a need to disseminate some data, there is, on the other hand, an equally strong need to protect some data that, for various reasons, should not be disclosed. Consider, for instance, the case of a private organization making available various data regarding its business (products, sales, etc.), but at the same time wanting to protect more sensitive information, such as the identity of its customers or its plans for future products. As another example, government agencies, when releasing historical data, may require a sanitization process to "blank out" information considered sensitive, either directly or because of the sensitive information it would allow the recipient to infer. Effective information sharing and dissemination can take place only if the data holder has some assurance that, while releasing information, disclosure of sensitive information is not a risk. Given the possibly enormous amount of data to be considered, and the possible inter-relationships between data, it is important that the security specification and enforcement mechanisms provide automatic support for complex security requirements, such as those due to inference channels and classification of data associations.

Mandatory policies, providing a simple (in terms of specification and management) form of access control appear suitable for the problem under consideration, where, in general, classes of data need to be released to classes of users. Mandatory policies control access to information on the basis of classifications, taken from a partially ordered set, assigned to data objects and subjects requesting access to them. Classifications assigned to information reflect the sensitivity of that information, while classifications assigned to subjects reflect their trustworthiness not to disclose the information they access to subjects not cleared to see it. By controlling read and write operations to allow subjects to read information whose classification is dominated by their level and write information only at a level that dominates theirs—mandatory policies provide a simple and effective way to enforce information protection. In particular, the use of classifications and the access restrictions enforced upon them ensure that information will be released neither directly, through a read access, nor indirectly, through an improper flow into objects accessible by lower-level subjects. This provides an advantage with respect to authorization-based control, which suffers from this last vulnerability.

Unfortunately, the capabilities of existing classification-based (multilevel) systems remain limited, and little, if any, support for the features mentioned above is provided. First, proposed multilevel database models work under the assumption that data are classified upon insertion (by assigning them the security level of the inserting subject) and therefore provide no support for the classification of existing, possibly unclassified, databases, where a different classification lattice and different classification criteria may need to be applied. Second, despite the large body of literature on the topic and the proposal of several models for multilevel database systems, the lack of support for expressing and combating inference and data association channels that improperly leak protected information remains a major limitation. Without such a capability, the protection requirements of the information are clearly open to compromise. Proper classification of data is crucial for classification-based control to effectively protect information secrecy.

As another example of the problems associated with typical security systems, there may be health records that include some non-confidential public information along with some confidential information. For example, the health records may include public information including the different types of illnesses of the patients and the number of patients with each illness. The confidential information may include the name of each patient and the actual illness of each patient. The typical data cleansing solution might be to remove the patient name from the records. The problem is that, based on other public information in the patient record or elsewhere such as the zip code and the date of birth, a person may be able to determine the patient's name (using inference and association techniques for example) and therefore his illness. Thus, despite expunging the patient's name from the records, the patient's name may be discovered. To protect the confidential patient name data, the patient name, the zip code and the date of birth all need to be classified at the same security level so that a person cannot use the latter two to determine the former. This means that to prevent such as attack, the proper classification of the data is critical to ensure security.

Thus, the problem is of computing security classifications to be assigned to information in a database system wherein the classifications reflect both explicit classification requirements and necessary classification upgrading to prevent exploitation of data associations and inference channels that leak sensitive information to lower levels. It is desirable to provide a system and method that may determine those calculations.

One of the major challenges in the determination of a data classification for a set of constraints is maximizing information visibility. Previous proposals in this direction are based on the application of optimality cost measures, such as upgrading (i. e., bringing to a higher classification, assuming all data is at the lowest possible level, otherwise) the minimum number of attributes or executing the minimum number of upgrading steps, or explicit constraints allowing the specification of different preference criteria. Determining such optimal classifications is often an NP-hard problem and existing approaches typically perform exhaustive examination of all possible solutions. Moreover, these proposals are limited to the consideration of totally ordered sets of classifications and intra-relation constraints due to functional and multivalued dependencies. While these cost-based approaches afford a high degree of control over how objects are classified, the computational cost of computing optimal solutions may be prohibitive. Moreover, it is generally far from obvious how to manipulate costs to achieve the desired classification behavior.

Thus, it is desirable to provide a system and method for determining security classifications using a lattice-based approach that overcomes the above limitations and problems with typical systems and it is to this end that the present invention is directed.

SUMMARY OF THE INVENTION

In accordance with the invention, a uniform formal classification determination framework is provided to express constraints on the classification to be assigned to objects. Like other typical schemes, constraints that express lower bounds on the classifications of single objects (explicit requirements) or sets of objects (association constraints) are considered as well as relationships that must hold between the classifications of different objects (inference constraints). In addition, the method allows for constraints that express upper bounds on the classification to be assigned to objects to take into consideration visibility requirements and subjects' existing (or prior) knowledge.

In accordance with the invention, a notion of minimality is introduced that captures the property of a classification satisfying the protection requirements without overclassifying data. An object is referred to as being "overclassified" if its assigned level from a partially ordered set is higher than is necessarily required by the applicable set of lower bound constraints. An efficient approach for computing a minimal classification is provided and a method implementing our approach that executes in low-order polynomial time is provided. In accordance with the invention, an important class of constraints, termed acyclic constraints, is identified for which the method executes in time linear in the size of the constraints. Finally, we show that the problem of computing minimal classifications becomes NP-hard if the set of classification levels is not a lattice, but may be an arbitrary poset.

The technique described can form the basis of a practical tool for efficiently analyzing and enforcing classification constraints. This technique can be used for the classification of existing data repository to be classified (or sanitized) for external release in the design of multilevel database schemas, as well as in the enhancement of already classified data whose classification may need to be upgraded to account for inference attacks.

Thus, in accordance with the invention, a method and system for determining a minimal security classification for one or more attributes in a data set is provided. The method comprises generating a constraint graph wherein the constraint graph has nodes with different security levels and nodes with different attributes so that the security level nodes and the attribute nodes are connected together to form a lattice and enforcing one or more upper bound security constraints wherein the upper bound constraint corresponds to the maximum security classification for the attribute to permit access to the attribute by as many people as possible. The method further comprises providing one or more lower bound constraints that protect the attribute from association and inference attacks, and determining a minimal security classification for the attribute based on the upper bound constraint and the one or more lower bound constraints so that the attribute is resistant to association and inference attacks yet accessible to many people as possible.

Thus, in accordance with another aspect of the invention, a method for assigning a partially ordered set of classification levels to a set of data attributes is provided. The method provides at least one simple constraint imposing a classification level boundary for an associated attribute and provides at least one complex constraint imposing another classification level boundary relating collectively to an associated collection of attributes. The method then assigns the classification levels to the attributes in a manner that satisfies the simple constraints and the complex constraints and avoids overclassifying the attributes wherein the assigning is done according to an automatic algorithm having a complexity no greater than polynomial with respect to a size of the constraints and of the partially ordered set.

In accordance with yet another aspect of the invention, a method for assigning a partially ordered set of levels to a set of objects is provided. The method provides at least one simple constraint imposing a level boundary for an associated object and provides at least one complex constraint imposing another level boundary relating collectively to an associated collection of object. Then, the levels are assigned to the objects in a manner that satisfies the simple constraints and the complex constraints and avoids overclassifying the objects wherein the assigning is done according to an automatic algorithm having a complexity no greater than polynomial with respect to a size of the constraints and of the partially ordered set.

In accordance with the invention, an apparatus for assigning a partially ordered set of levels to a set of objects is provided The apparatus comprises means for representing at least one simple constraint imposing a level boundary for an associated object and means for representing at least one complex constraint imposing another level boundary relating collectively to an associated collection of objects. The apparatus further comprises means for assigning the levels to the objects in a manner that satisfies the simple constraints and the complex constraints and avoids overclassifying the objects and further being operable to perform the assigning according to an automatic algorithm having a complexity no greater than polynomial with respect to a size of the constraints and of the partially ordered set.

Thus, in accordance with another aspect of the invention, a method for assigning access classification levels from a partially ordered set to a plurality of data attributes is provided. The method provides one or more upper bound constraints each imposing an upper bound on the classification level to be assigned to an associated data attribute and provides one or more lower bound constraints each imposing a lower bound relating collectively to the classification levels to be assigned to an associated collection of the data attributes. Then, an initial assignment of classification levels is determined that satisfies the upper bound and lower bound constraints and the levels assigned to each attribute is incrementally decremented while continuing to satisfy all of the provided constraints, thereby tending to decrease the overclassification of attributes and to increase data availability.

BRIEF DESCRIPTION OF THE DRAWINGS

FIGS. 1a–1c are diagrams illustrating examples of security lattices;

FIG. 2 is a diagram illustrating a classification constraint graph;

FIG. 3 is a diagram illustrating a security classification system in accordance with the invention;

FIGS 5a–5c are diagrams illustrating an example of the upper and lower constraints, the constraint graph and the resulting upper bounds, respectively, for an exemplary data set in accordance with the invention;

FIGS. 7a–7c are diagrams illustrating an example of the acyclic simple constraints, the corresponding constraint graph and the minimal solution, respectively, for an exemplary data set in accordance with the invention;

FIGS. 8a–8d are diagrams illustrating an example of the acyclic simple and complex constraints, the corresponding constraint graph and the minimal solutions, respectively, for an exemplary data set in accordance with the invention;

FIGS. 9a–9c are diagrams illustrating an example of the cyclic constraints, the corresponding constraint graph and the minimal solution, respectively, for an exemplary data set in accordance with the invention;

FIG. 10 illustrates the pseudocode for implementing the security classification method in accordance with the invention;

FIGS. 11a–11c are diagrams illustrating an example of the security lattice, the corresponding constraint graph and the corresponding classification process, respectively, for an exemplary data set in accordance with the invention;

FIGS. 13a–13b are diagrams illustrating the POSET for exemplary data and a four element POSET for the same exemplary data in accordance with the invention.

DETAILED DESCRIPTION OF A PREFERRED EMBODIMENT

Figure 4:
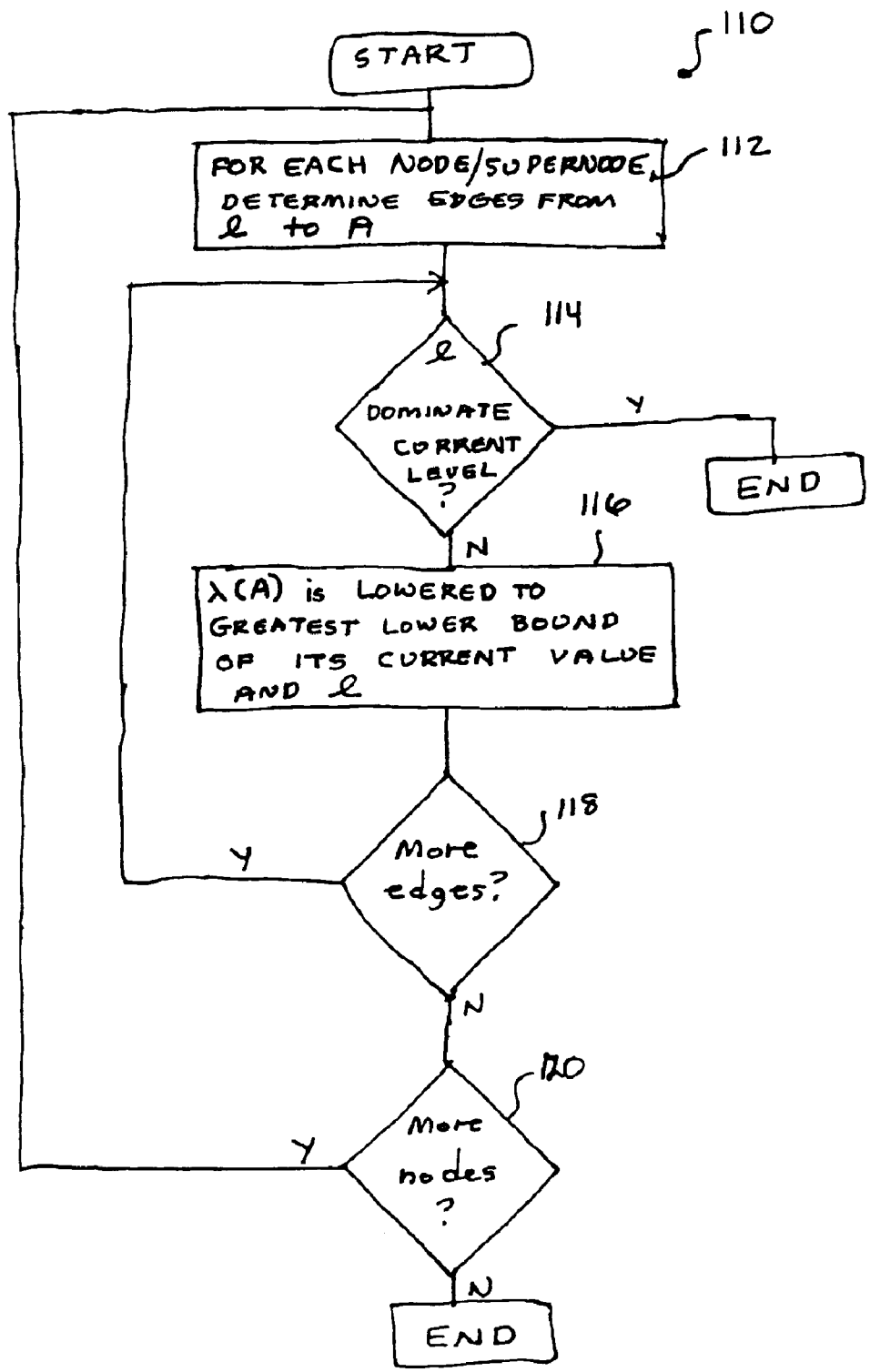
FIG. 4 is a flowchart illustrating an upper bound constraint determination method in accordance with the invention.

The invention is particularly applicable to a client/server-based security classification determination system and it is in this context that the invention will be described. It will be appreciated, however, that the system and method in accordance with the invention has greater utility since it may be implemented on a variety of different computers and computer systems, such as web-based systems, stand-alone computer systems and the like. Thus, the invention is not limited to the client-server implementation described herein. Prior to describing the security classification system and method in accordance with the invention, the classification problem and several examples that are used throughout the description below are described.

Basic Definitions and Problem Statement

Mandatory security policies are based on the assignment of access classes to objects and subjects. Access classes in a set L are related by a partial order, called the dominance relation, denoted, that governs the visibility of information, where a subject has access only to information classified at the subject's level or below (no-read-up principle). The expression a b is read as "a dominates b", and a b (i. e., a b and a≠b)as "a strictly dominates b". The partially ordered set (L,) is generally assumed to be a lattice and, often, access classes are assumed to be pairs of the form (s, C), where s is a classification level taken from a totally ordered set and C is a set of categories (or compartments) taken from an unordered set. In this context, an access class dominates another if the classification level of the former is at least as high in the total order as that of the latter, and the set of categories is a superset of that of the latter.

FIG. 1(a), for example, illustrates a security lattice 30 with two levels (TS S) (TS=Top Secret and S=Secret) and two categories (Army, Nuclear). For generality, we do not restrict our approach to specific forms of lattices, but assume access classes, to which we refer alternately as security levels or classifications, to be taken from a generic lattice. We refer to the maximum and minimum elements of a lattice as (top) and 1 (bottom), respectively, according to standard practice.

FIGS 1a, 1b and 1c depicts three classification lattices 30, 40, 50 that are used to illustrate examples of the system and method as described below. For example, FIG. 1b illustrates the security lattice 40 including four different security levels (ranging from "Top Secret" to "unclassified" in descending order) while FIG. 1c illustrates the security lattice 50 with different security levels as shown. A lattice for purposes of this description is defined as a partial order wherein the partial order has a top and bottom element and every pair of elements in the lattice has a unique greatest lower bound.

Returning to the problem of classification, the security level to be assigned to an attribute may depend on several factors. The most basic consideration in determining the classification of an attribute is the sensitivity of the information it represents. For example, if the names of a hospital's patients are not considered sensitive, the corresponding patient attribute might be labeled at a level such as Public (See FIG. 1c). On the other hand, the illnesses of patients may be considered more sensitive, and the illness attribute might be labeled at a higher level, such as Research (See FIG. 1c also).

Additional considerations that can affect the classification of an attribute include data inference and association. Data inference refers to the possibility of determining, exactly or inexactly, values of high-classified attributes from the values of one or more low-classified attributes. For example, a patient's insurance and employer may not be considered sensitive, yet insurance and employer together may determine a specific insurance plan. Thus, knowledge of a patient's insurance and employer may permit inference of at least the type of insurance plan. If the insurance plan is considered more sensitive than either the insurance or employer, it may be necessary to raise the classification of either the insurance or employer attributes (or possibly both) to the level of the insurance plan information to prevent access to information that would enable inference of insurance plan.

Data association refers to the possibility that two or more attributes are considered more sensitive when their values are associated than when either appears separately. For example, the fact that there is a patient named Alice may have a Public level of security, and the fact that there is a patient whose illness is HIV may be classified at the Research security level. However, the fact that Alice's illness is HIV may be considered even more sensitive (e.g., a Clinical security classification). Although association differs from inference, the classification requirements it imposes are similar—if the association of two or more attributes is considered more sensitive than any of the individual attributes, the classification of at least one of the attributes must be set sufficiently high to prevent simultaneous access to all the attributes involved in the association.

As those skilled in the art appreciate, a "partial ordering" is a reflexive, antisymmetric, and transitive relation. A "partial" ordering means that the relation need not necessarily be defined for every pair of objects in the partially ordered set, although it may be; in the latter case, the set qualifies formally as both a "partially ordered set" as well as a "fully ordered set". For example, ordered classification levels such as Unclassified, Secret and Top Secret for a partially ordered set. Now, the classification constraints in accordance with the invention will be described in more detail.

Classification Constraints Classification constraints specify the requirements that the security levels assigned to attributes must satisfy. Specifically, classification constraints are constraints on a mapping $\lambda$: A L that assigns to each attribute A∈A, a security level l∈L, where (L,) is a classification lattice.

Lower Bound Constraints

We first identify four general classes of constraints according to the requirements they specify:

Basic constraints specify minimum classifications for individual attributes, for example, $\lambda$ patient) Public and $\lambda$ (illness) Research. They reflect the sensitivity of the information represented by individual attributes and ensure that the attributes are assigned security levels high enough to protect the information.

Inference constraints are used to prevent bypassing of basic constraints through data inference. For example, the constraint lub{$\lambda$(employer), $\lambda$(insurance)} $\lambda$plan), corresponding to the inference example from the previous discussion, requires that the least upper bound (lub)of the levels assigned to attributes employer and insurance dominate the level assigned to attribute plan so that a person, without proper authority, cannot view the employer and insurance attributes since it is possible to infer the plan information. Note that this constraint does indeed express the desired prevention of (low-to-high) inference from employer and insurance to plan, since, if the constraint is satisfied, a subject can access both employer and insurance only if the subject's clearance level dominates the classification of plan. It is also the weakest such constraint, allowing the greatest possible flexibility in the assignment of classifications to employer and insurance. In particular, it does not necessarily require the classification of either employer or insurance to dominate that of plan. For example, referring to the lattice in FIG. 1(c), if $\lambda$(plan)=Admin the assignments $\lambda$ $\lambda$ (employer)=Research and $\lambda$(insurance)=Financial satisfy the constraint, since lub{Research, Financial}= Admin, although neither Research nor Financial dominates Admin.

Association constraints are used to restrict the combined visibility of two or more attributes. For example, the association constraint lub{$\lambda$(patient), $\lambda$(illness)) Clinical corresponding to the association example from the earlier discussion, requires that the least upper bound of the classifications of patient and illness dominate Clinical. Note that the same effect could be achieved by a basic constraint requiring the classification of either patient or illness to dominate Clinical, but this alternative is in general stronger than necessary. The explicit association constraint is the weakest constraint form that specifies the desired requirement.

Classification integrity constraints are imposed by the security model itself and have the same form as inference and association constraints. They typically include primary key constraints and referential integrity constraints. Primary key constraints require that key attributes be uniformly classified and that their classification be dominated by that of the corresponding non-key attributes. Referential integrity constraints require that the classification of attributes representing a foreign key dominate the classification of the attributes for which it is foreign key. The purpose of classification integrity constraints is to ensure that the portion of a database visible at any given level adheres to the data integrity constraints from which the classification integrity constraints are derived. Otherwise, subjects at certain levels would see tuples with empty keys (in the case of primary key constraints)or foreign keys with no corresponding primary key (in the case of referential integrity constraints).

The constraints in all the four categories express restrictions on the visibility of information and are termed lower bound constraints, defined formally as follows.

Definition 2.1 (Lower Bound Constraint) Let A be a set of attributes and L=(L,) be a security lattice. A lower bound constraint over A and L is an expression of the form lub{$\lambda(A_1), \ldots, \lambda(A_n)$} X, where n>0, A∈A, i=1, . . . , n, and X is either a security level l∈L or is of the form $\lambda$(A), with A∈A. If n=1, the expression may be abbreviated as $\lambda(A_j)$ X.

Note that all constraints allowed by this definition have the form (as opposed to), with security levels on the right hand side only. That is, they specify a lower bound on the classification assigned to attributes (which can be upgraded as required by other constraints). For instance, a constraint requiring illness to be classified at level Research will be stated as $\lambda$(illness) Research, implying that illness must be classified at least Research. This interpretation is a property of the problem under consideration, where data classification may need to be upgraded to combat inference channels and to solve association constraints. Note that assigning to an attribute a classification lower than that required by lower bound constraints would, directly or indirectly, leak information to subjects not cleared for it. Thus, the main function of lower bound constraints is to capture the requirements on classification assignments that will prevent improper downward information flow.

Although lower bound constraints are sufficient for expressing the prevention of downward information flow, it can also be useful to establish maximum levels that should be assigned to attributes. Such maximum levels can be specified by upper bound constraints, defined as follows.

Upper Bound Constraints

Definition 2.2 (Upper Bound Constraint) Let A be a set of attributes and L=(L,) be a security lattice. An upper bound constraint over A and L is an expression of the form l $\lambda$(A), where l∈L is a security level and A∈A is an attribute.

Upper bound constraints have two main uses. One is the specification of visibility requirements, since their satisfaction ensures that the attribute will be visible to all subjects with level dominated by the specified upper bound. For example, if we wish to guarantee that names of patients in a hospital are always accessible to the administrative staff, we might impose the constraint Admin $\lambda$(patient) to prevent the classification of patient from being raised above Admin.

In fact, this constraint together with the lower bound constraint $\lambda$(Patient) Admin effectively forces the classification of patient to be exactly Admin.

The other main use of upper bound constraints is the modeling of subjects' existing or prior knowledge of certain information stored in the database. If such knowledge is not accounted for in the classification of the database, it is possible to produce classifications that provide a false sense of security. For example, suppose that providers know the illnesses of patients in a hospital. This knowledge could be captured by the constraint Provider $\lambda$(illness). Without this constraint, it might happen that inference or association constraints produce a higher (or incomparable) security classification, say HMO, for illness. Thus, although patient appears to be information classified at the HMO level, it really is not, since providers already know the illnesses of patients. Explicit upper bound constraints can prevent the assignment of such misleading classifications.

The lower and upper bound constraints can be represented abstractly as pairs (lhs, rhs), where lhs is the security level or set of attributes appearing on the left-hand side of the constraint, and rhs is the attribute or security level appearing on the right-hand side of the constraint. Among lower bound constraints we refer to constraints whose left-hand side is a singleton as simple constraints, and to constraints with multiple elements in the left-hand side as complex constraints. Although the definitions do not permit lub expressions on the right-hand sides of constraints, this does not limit their expressiveness, since a constraint of the form X lub($\{\lambda(A_1), \ldots, (A_n)\}$) is equivalent to a set of constraints $(X \lambda(A_1), \ldots, X \lambda(A_1))$. In the remainder of the paper we refer to arbitrary sets of lower and upper bounds constraints simply as classfication constraints and distinguish between lower and upper bound constraints when necessary. Any set of classification constraints can be viewed as a directed graph, which we call the constraint graph, not necessarily connected, containing a node for each attribute A$\epsilon$A and security level l$\epsilon$L. Each constraint (lhs, rhs), with lhs=$\{A_l, \ldots, A_n\}$, is represented by a directed edge from node $A_1$, if n=1, or hypernode containing $A_1, \ldots, _n$, if n>1, to node rhs. Now, an example of a classification graph will be briefly described.

FIG. 2 illustrates an example of a classification constraint graph 60, where security levels are taken from the security lattice 50 shown in FIG. 1c. In the graph, circle nodes 62 represent attributes, square nodes 64 represent security levels, and dashed ellipses 66 represent hypernodes. Note that the upper bound constraints 68 are edges from level nodes to attribute nodes. All other edges 70 represent lower bound constraints.

The constraints in this example refer to patient information in a hospital database and reflect the following scenario. The two association constraints require protection of each of the patient's illness and bills information. In particular, the association between patients and their illnesses (e.g., the knowledge of which patient has which illness) can be known only to subjects at security level Clinical or above (as shown by the dashed ellipses with the arrow pointing towards the Clinical level), and the association between patients and their bills can be known only to subjects at level Admin or above (as shown by the shaded ellipses with the arrow towards the Admin level). Other lower bound constraints reflect (precise or imprecise) inferences that can be drawn from the data and that must therefore be reflected in the classification. For instance, by knowing the doctor who is caring for a patient, a subject can deduce the patient's illness within the specific set of illnesses falling in the doctor's specialty. Hence, the classification of attribute doctor must dominate the classification of attribute illness as shown by the arrow between the attributes. Analogously, the insurance plan together with the health care division allows inference on the doctor. Hence, subjects should have visibility on both the division and plan only if they have visibility on doctor. In terms of the classifications, the least upper bound of the classification of plan and division must dominate the classification of doctor. The motivation behind the other inference constraints appearing in the figure are analogous.

There are also several basic constraints that require the classification of certain attributes to dominate specific levels. For instance, prescriptions can be released only to subjects at the level Clinical or above. In addition, there are several upper bound constraints reflecting the fact that specific information cannot be classified above certain levels because of required access or to account for information already known, as discussed. For instance, the classification of patient must be dominated by Admin and the classification of illness must be dominated by Provider.

In the remainder of this description, we refer to the constraints and to their graphical representation interchangeably, and we often refer to a constraint (lhs, rhs) as the existence of an edge between lhs and rhs. Among lower bound constraints, we identify two subclasses of constraints. In particular, lower bound constraints whose graph representation is acyclic (i. e., is a DAG) are called acyclic constraints, while those involved in a cycle, including cycles through hypernodes, are called cyclic constraints. A cycle involving only simple constraints is called a simple cycle. For example, considering only the lower bound constraints in FIG. 2, constraints (illness, division), ({division, plan}, doctor), and (doctor, illness) are cyclic and constraints (exam, treatment), (treatment, visit), and (visit, exam) constitute a simple cycle while all other lower bound constraints are acyclic. Now, the concept of a minimal classification in accordance with the invention will be described.

Minimal Classification

Given a set of classification constraints, the objective of a minimal classification is to produce a classification $\lambda$: A L, which is an assignment of security levels in L to objects (attributes)in A, that satisfies the constraints. A classification $\lambda$ satisfies a set C of constraints, denoted $\lambda$ C, if for each constraint, the expression obtained by substituting every $\lambda$(A) with its corresponding level holds in the lattice ordering. In general, there may exist many classifications that satisfy a set of constraints. However, not all classifications are equally good. For instance, the mapping $\lambda$: A {T}classifying all data at the highest possible level satisfies any set of lower bound constraints. Such a strong classification is clearly undesirable unless required by the classification constraints, as it results in unnecessary information loss (by preventing release of information that could be safely released). Although the notion of information loss is difficult to make both sufficiently general and precise, it is clear that a first requirement in minimizing information loss is to prevent overclassification of data That is, the set of attributes should not be assigned security levels higher than necessary to satisfy the classification constraints. A classification mapping that meets this requirement is said to be minimal. To be more precise, we first extend the notion of dominance to classification assignments. For a given set A of attributes, security lattice (L,), and mappings $\lambda_1$: A L and $\lambda_2$: A L, we say that $\lambda_1 \lambda_2$ if A$\epsilon$A: $\lambda_1(A) \lambda_2(A)$. The notion of minimal classification can now be defined as follows.

Definition 2.3 (Minimal Classification) Given a set A of attributes, security lattice L=(L,) and a set C of classification constraints over A and L, a classification $\lambda$: A L is minimal with respect to C iff (1)$\lambda$ C; and (2) for all $\lambda'$: A L such that $\lambda'$ C, $\lambda\lambda' \Rightarrow \lambda = \lambda'$.

In other words, a minimal classification is one that both satisfies the constraints and is (pointwise) minimal in the lattice. Note that a minimal classification is not necessarily unique. The main problem now is to compute a minimal classification from a given set of classification constraints.

Problem 1 (MIN-LATTICE ASSIGNMENT) Given a set A of attributes to be classified, a security lattice L=(L,), and a set C of classification constraints over A and L, determine a classification assignment $\lambda$: A L that is minimal with respect to C In general, a set of constraints may have more than one minimal solution. The following sections describe an approach for efficiently computing one such minimal solution and a (low-order) polynomial-time algorithm that implements the approach. Now, the security classification system in accordance with the invention will be described in more detail before describing the method and algorithms is more detail.

FIG. 3 is a diagram illustrating a security classification system 80 in accordance with the invention. The security classification system may include one or more users 82 (User #1 . . . User #N) who are connecting to a central computer 84, such as a server, over a computer network 86, such as a local area network, a wide area network, the World Wide Web or the like. Each user may be using a typical personal computer or other type of computer in order to attempt to retrieve one or more pieces of data from a database 88 connected to the computer 84. The retrieval of the data from the database is controlled by a security system 90 in accordance with the invention that regulates what data can be accessed by what people. In a preferred embodiment, the security system is one or more software modules stored in a memory 92 of the computer 84 and executed by the central processing unit (CPU) 94 of the computer. The security system in accordance with the invention is executed by the CPU in order to determine classifications for the data in the database so that confidential data cannot be subjected to an association or an inference attack. To accomplish this, the security module 90 may include one or more sub-modules that implement some of the functionality of the security module. The one or more sub-modules may include a upper bound determiner module (UB) 96 that enforces any upper bound constraints to determine a firm maximum security level for each attribute and a lower bound determiner module (LB) and minimum classification module (Min) 98, 100 that determines the lower bound contestants and determines the minimal classification based on the lower bound contestants. The functions of each of these modules will be described in more detail.

A basic requirement that must be satisfied to ensure the existence of a classification $\lambda$ is that the set of classification constraints provided as input by complete and consistent. A set of classification constraints is complete if it defines a classification for each attribute in the database. It is consistent if there exists an assignment of levels to the attributes, that is, a definition of $\lambda$, that simultaneously satisfies all classification constraints. Completeness is easily guaranteed by providing a default classification constraint of the form $\lambda(A) \perp$ for every attribute A$\in$A. In addition, any set of lower bound constraints, which use only the dominance relationship and security levels (constants) only on the right-hand side, is by itself consistent, since mapping every attribute to $\perp$ trivially satisfies all such constraints. Analogously, any set of upper bound constraints is by itself trivially consistent.

However, a set of constraints that includes both upper and lower bound constraints is not necessarily consistent, the simplest example of inconsistent constraints being $\{\lambda(A), \perp \lambda A(A)\}$ (assuming that and $\perp$ are distinct).

Given an arbitrary set of constraints, our method first enforces upper bound constraints to determine a firm maximum security level for each attribute. In the process, the consistence of the entire constraint set is checked. If the enforcement of upper bound constraints succeeds, a second phase evaluates the lower bound constraints to determine a minimal classification. In this method, we assume throughout that the left- and right-hand sides of each constraint are disjoint, since any constraint not satisfying this condition is trivially satisfied. Now, the method for determining the upper bound constraint in accordance with the invention will be described.

FIG. 4 is a flowchart illustrating an upper bound constraint determination method 110 in accordance with the invention. Upper bound constraints require the level of an attribute to be dominated by a specific security level. Because of the transitivity of the dominance relationship and the presence of lower bound constraints, upper bound constraints can indirectly affect other attributes besides those on which they are specified. For instance, the combination of upper bound constraint Admin $\lambda$(patient) and lower bound constraint $\lambda$(patient). $\lambda$(employer) forces Admin as a maximum level for attribute employer as well. Intuitively, an upper bound constraint affects all the attributes on those paths in the constraint graph that have the upper bound constraint as the initial edge. Each upper bound constraint can thus be enforced by traversing paths from security levels and propagating the constraint forward, lowering the levels of attributes encountered along the way accordingly (to the highest levels that satisfy the constraints). More precisely, let l be a security level of the left-hand side of some upper bound constraint.

For each edge leaving from node l to some attribute node A, we propagate l forward as follows in step 112. If l dominates the current level of A in step 114, the upper bound constraint under consideration is satisfied, and the process terminates. If not, the level $\lambda$(A) of attribute A is lowered to the greatest lower bound of its current value and l in step 116. A unique such level l' is guaranteed to exist because we are working in a lattice. For each edge leaving from A, level l' is propagated to the node reached by that edge. Also, for each edge leaving from a hypernode that contains A, the least upper bound l" of all the attributes in the hypernode is propagated to the node reached by that edge. These steps are shown in the flowchart as a decision block to determine if more edges are present in step 118 and to determine if more nodes are present in step 120. Propagating a level l' to an attribute node A' means lowering $\lambda$(A') to the greatest lower bound of its current level and l', and proceeding recursively on all edges leaving from A' or from hypernodes containing it as just described. This process terminates for each path when a leaf node (security level) is reached. Then, if the level being propagated dominates the level of the leaf rode, the process terminates successfully for the upper bound constraint being considered. Otherwise, an inconsistency in the constraints has been detected. In this case the process terminates with failure. As a result of the upper bound determination method described herein, the maximum allowed security level for each attribute is determined. The maximum security level for each attribute may then be used by the minimal solution determination method described below to determine the minimal solution (e.g., sufficient security to protect the data without unnecessarily limiting access to the data). Now, an example of the upper bound determination in accordance with the invention will be described.

FIGS. 5a–5c are diagrams illustrating an example of the upper and lower constraints, the constraint graph and the resulting upper bounds, respectively, for an exemplary data set in accordance with the invention. In particular, the example in FIGS. 5a–5c, with security levels taken from the lattice in FIG. 1(c), provides a simple illustration of the upper bound computation. Initially, the level of each attribute is set to HMO (T) which is the top security level of the lattice of FIG. 1c. There is one upper bound constraint, Provider $\lambda$(illness). Propagating level Provider forward causes $\lambda$(illness) to be lowered to HMO Provider=Provider. Likewise, Provider is propagated to division as a result of the constraint $\lambda$(illness) $\lambda$(division), lowering $\lambda$(division) to Provider. Next, the constraint $\lambda$(division) Public is checked and found to be satisfied, since Provider Public. Similarly, the constraint lub{$\lambda$(division), $\lambda$(plan)} doctor is found to be satisfied, since lub {Provider,HMO}=HMO $\lambda$(doctor)= HMO. Finally, the remaining constraint on illness, $\lambda$(illness) Research is checked and found to be satisfied, and the upper bound computation succeeds with the upper bounds as shown in FIG. 3(c). Note that if we were to replace the upper bound constraint with Financial $\lambda$(illness), for example, the process would fail upon checking $\lambda$(illness) Research, since—(Financial Research). Now, a method for determining a minimal solution from the lower bound constraints in accordance with the invention will be described.

Figure 6:
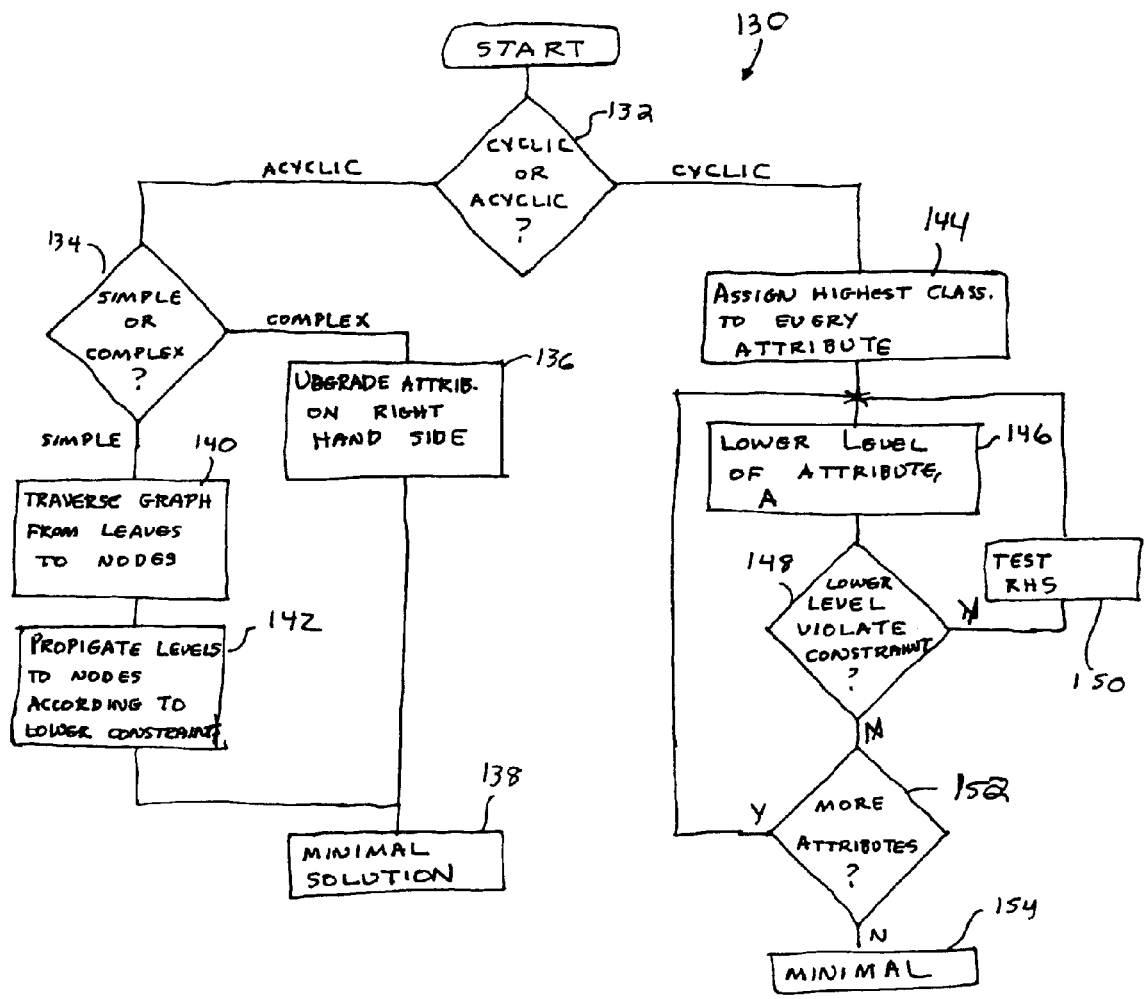
FIG. 6 is a flowchart illustrating a lower bound constraint and minimal solution determining method in accordance with the invention.

FIG. 6 is a flowchart illustrating a lower bound constraint and minimal solution determining method 130 in accordance with the invention. Examples of the application of this method are shown in FIGS. 7–9. Upon successful completion of the enforcement of upper bound constraints, the maximum allowed security level for each attribute is known, and the upper bound constraints require no further consideration. The second phase thus deals exclusively with lower bound constraints to determine a minimal classification. Among lower bound constraints, we consider separately the acyclic and cyclic constraints (as identified above). The reason for considering them separately is that acyclic constraints, which are expected to account for most constraints in practice, can be solved using a simpler and more efficient approach than that needed for cyclic constraints.

In accordance with the invention, the method 130 first separates lower bound constraints into acyclic or cyclic constraints in step 132. Each of the steps of the method will be briefly described here and then described in more detail below. In step 134, the method determines if the acyclic constraint is simple or complex. If the acyclic constraint is complex (as defined above), then the attributes on the right hand side of the dominance equation are upgraded in step 136 so that the minimal solution may be determined in step 138. If the acyclic solution is simple (as defined above), then the method traverses the constraint graph from the leaves with the security levels to the nodes in step 140. During the backwards traversing of the constraint graph, the security levels of the leaves are propagated to the nodes according to the lower bound constraints in step 142 so that a minimal solution is determined in step 138.

If a cyclic constraint exits, then the highest security level is assigned to each attribute (based on the upper bound constraints) in step 144. In step 146, a security level of an attribute is lowered and the method determines if the lower level violates a constraint in step 148. If a constraint is violated, then the right hand side (rhs) is tested in step 150 and the method loops back to step 146. If the lower level does not violate a constraint, then the method determines if there are more attributes to test in step 152 and loops back to step 146 to lower the levels of those attributes. If all of the attributes have been completed, then the minimal solution is determined in step 154. In this manner, a minimal solution that protects the data sufficiently while permitting as many people to access the data is achieved. The acyclic minimal solution will now be described along with an example of the process.

Acyclic Constraints

A straightforward approach to computing a minimal classification involves performing a backward propagation of security levels to the attributes. Consider an acyclic constraint graph with no hypernodes (simple constraints only). Starting from the leaves, we traverse the graph backward (opposite the direction of the edges) and propagate levels according to the constraints. Intuitively, propagating a level to an attribute node A according to a set of constraint edges $\{(A,X_1), \ldots ,(A,X_n)\}$ means assigning to A the least upper bound of all levels represented by $X_1, \ldots ,X_n$. As long as each $X_i$ is guaranteed to remain fixed, propagating in this way ensures that A is assigned the lowest level that satisfies all constraints on it. Thus, for acyclic simple constraints the unique, minimal solution can be computed simply by propagating levels back from the leaves, visiting all the nodes in (reverse) topological order.

As an example, consider the seven simple constraints shown in FIG. 7(a) and the corresponding constraint graph 7(b), where the security levels are taken from the lattice in FIG. 1(c). Applying the process just outlined, we first propagate level Public to visit and level Research to illness. With the final levels for visit and illness now known, we next propagate the least upper bound of Public, $\lambda$(visit), and $\lambda$(illness), which is Research, to treatment. Finally, we propagate the least upper bound of $\lambda$(treatment) and Clinical, which is Clinical, to prescription, resulting in the minimal solution shown in FIG. 7(c). In the minimal solution, the illness attribute has at least a research security level, the prescription attribute has at least a clinical security level and the like which ensures adequate security from association and inference attacks but provides as much access to the data as possible.

This process is clearly the most efficient one can apply, since each edge is traversed exactly once. In terms of the constraints, this corresponds to evaluating the constraints in a specific order, evaluating each constraint only once, when the level of its right-hand side becomes definitely known, and upgrading the left-hand side accordingly.

In a set of acyclic constraints, the propagation method described for simple constraints alone requires only minor adaptation to handle complex constraints as well. The key observation is that, if a complex constraint is not already satisfied, it can be solved minimally by upgrading any one of the attributes on the left-hand side, provided that neither the level of the right-hand side nor the levels of any other attributes on the left-hand side are later altered. As long as the constraints are acyclic, there exists an order of constraint evaluation (security-level back-propagation) that ensures that the security levels of all attributes involved in a complex constraint are known prior to the selection of one for upgrading, if necessary, to satisfy the constraint.

For example, consider the constraints in FIG. 8(a) and the corresponding constraint graph in FIG. 8(b). The complex constraint lub{$\lambda$(patient), $\lambda$(bill)} Admin can be solved by assigning either Admin to bill or Research to patient. Note that either solution is minimal according to Definition 2.3, and thus, minimal solutions for sets that include complex constraints are generally not unique. The particular minimal solution generated depends on the order of constraint evaluation. For the example in FIG. 8, the first solution (as shown in FIG. 8(c)) is computed if the simple constraint on patient is evaluated first, whereas the second solution (shown in FIG. 8(d)) is computed if the simple constraint on bill is evaluated first. Now, the determination of a minimal solution for a cyclic constraint will be described.

Cyclic Constraints

For cyclic constraints, the simple back-propagation of security levels is not directly applicable, and it is not clear whether the method can be adapted easily to deal with arbitrary sets of cyclic constraints. Simple cycles are easily handled, since they imply that all attributes in the cycle must be assigned the same security level—we can simply "replace" the cycle by a single node whose ultimate level is then assigned to each of the original attributes in the cycle. For example, we might imagine replacing the simple cycle involving attributes exam, treatment, and visit in FIG. 2 by a single node labeled "exam, treatment, visit" and proceeding as before. However, when complex constraints are involved in a cycle, the problem becomes more challenging. Recall that a complex constraint can be solved minimally by selecting any left-hand-side attribute to be upgraded, provided that the level of no other attribute in the constraint subsequently changes. For cyclic complex constraints, it can be difficult to ensure that this requirement is satisfied. We might upgrade the level of one attribute A on the left-hand side of a complex constraint only to find that a higher level is propagated through a cycle to another attribute A' in the same constraint. The constraint remains satisfied, but the resulting classification may not be minimal, since the original upgrading of A may have been unnecessary for satisfaction of the constraint.

In many cases it may be possible to determine a priori an order of constraint evaluation and a unique candidate for upgrading in each complex constraint that guarantees a minimal classification using back-propagation of levels through cycles. However, as the cycles become more complicated, the criteria and analysis needed for determining the attributes to be upgraded and a suitable evaluation order become more complex. The problem becomes particularly acute for cyclic complex constraints whose left-hand sides are nondisjoint (for example, constraints ({illness, patient}, Clinical)and ({patient, bill},Admin) in FIG. 2), since the choice of the attribute to be up-graded in one constraint may invalidate the choice made for another. Moreover, it is not generally possible to choose a single attribute in the intersection of two or more left-hand sides to be upgraded for all intersecting constraints. As an example, consider three constraints whose left-band sides are {A, B}, {B, C}, and {A, C}, respectively. If all three constraints require an attribute to be upgraded, one of the constraints will necessarily have both attributes upgraded. The result in such a case can still be minimal. However, it can be far from clear whether any two attributes will do, and if not, which two should be chosen, when such intersecting constraints are entangled in a complex cycle.

Since it is difficult, at best, to ensure that no upgrading operation performed during back-propagation of levels through cycles involving complex constraints will ever be invalidated, we appear to be left with essentially two alternatives: (1) augment the back-propagation approach with backtracking capabilities for reconsidering and altering upgrading decisions that result in nonminimal classifications, or (2) develop a different approach for computing minimal classifications from cyclic constraints. We would of course prefer a method that is as close as possible in computational efficiency to the simple level propagation for acyclic constraints. Thus, we reject alternative (1), since the worst-case complexity of a backtracking approach is proportional to the product of the sizes of the left-hand sides of all constraints in the cycle. Instead, we develop a new solution approach to be applied to sets of cyclic constraints. This new approach begins with all attributes involved in a cycle at high security levels, and then attempts to lower the level of each such attribute incrementally as long as all affected constraints remain satisfied.

More specifically, assume that we are given a set of cyclic constraints and that every attribute in the cycle is initially assigned the highest classification allowed by the upper bound constraints. For each attribute A involved in the cycle, we attempt to lower the level of A, one step at a time along an arbitrary path down the lattice. At each step we check whether lowering the level of A would violate any constraints, as follows. For each constraint on A, we check whether the level of the left-hand side would still dominate that of the right-hand side if A were to be assigned the lower level. If the constraint would still be satisfied, we simply continue. Otherwise, we check whether the level of the right-hand side can also be lowered so that the constraint is again satisfied. If the right-hand side is a level constant, we compare that level to the current level of A, failing if it is not dominated. Otherwise, the right-hand side is another attribute A', and we then attempt (recursively)to lower the level of A'. If, finally, the attempted lowering of A from a level $l_1$ to a level $l_2$ fails, the lowering is attempted again along a different path down the lattice from $l_1$. The last level for which lowering A succeeds is A's final level. Repeating this procedure for each attribute, the result at the end of the entire process is a minimal classification for all attributes in the cycle.

Unlike the back-propagation method, which is applicable only to acyclic constraints, the incremental, forward lowering approach is applicable to all constraints. However, it is not generally as efficient, although its complexity remains low-order polynomial. Thus, it is preferable to apply the simple back-propagation method wherever possible and reserve the forward-lowering approach for sets of cyclic constraints. The following section describes an algorithm that elegantly combines the two approaches for greatest efficiency on arbitrary sets of constraints.

For a simple illustration of this procedure, consider the cyclic constraint set in FIG. 9(a) and the corresponding constraint graph in FIG. 9(b), where the security levels are taken from the lattice in FIG. 1(c). Assume that all four attributes (division, doctor, illness, and plan) are initially labeled at level HMO (T). We select an arbitrary attribute, say illness, from the cycle and attempt to lower its level. We may try either Admin or Provider, and we choose Admin arbitrarily. We can lower (illness) to Admin as long as all affected constraints remain satisfied. The first constraint on illness remains satisfied, since Admin Research. The second constraint on illness remains satisfied only if $\lambda$(division) can also be lowered to Admin. Attempting to lower $\lambda$(division) to Admin, we find the simple constraint on division remains satisfied, and the complex constraint as well, since $\lambda$(plan) is HMO. It is easy to see, then, that $\lambda$(illness) and, consequently, $\lambda$(division) can be lowered ultimately to Research. Suppose now that we attempt to lower $\lambda$(division). Since $\lambda$(division)=Research we may try Public and find that both the simple and complex constraint on division remain satisfied. Finally, we attempt to lower $\lambda$(doctor). We first try level Admin and find that the simple constraints on doctor remain satisfied, since Admin Public and Admin λ(illness)=Research. We now try to lower λ(doctor) to Financial. This attempt fails because the simple constraint λ(doctor) λ(illness) remains satisfied only if λ(illness)can be lowered to Public. This is not possible because of the constraint λ(illness) Research. We then try to lower λ(doctor) to Clinical and succeed. Subsequently, we try to lower λ(doctor) to Research. Again the simple constraints on doctor remain satisfied, and so in the last step of the process we try to lower λ(doctor) to Public. As before, this attempt fails because it would require λ(illness) to be lowered to Public as well, which cannot be done. Once the cyclic constraints have been solved, the backward propagation process is executed, and plan is assigned level Admin, which is the lowest level that it can assume without violating the dominance constraints imposed on it, namely lub{λ(division), λ(plan)} λ(doctor) and λ(plan) Financial. The computed minimal solution appears in FIG. 9(c). Now. an example of the pseudocode that implements that above methods will be described.

FIG. 10 illustrates the pseudocode for implementing the security classification method in accordance with the invention. At a high level, the algorithm implementing our approach consists of four main parts. In the first part, we identify sets of cyclic constraints to be evaluated with the forward lowering approach and determine the order in which attributes (sets of attributes in the case of cyclic constraints) will be considered for both the upper and lower bound constraint solving phases. The second part enforces upper bound constraints and, in the process, checks the entire input constraint set for consistency. The third and fourth parts represent, respectively, the back-propagation method for acyclic constraints and the forward lowering method for cyclic constraints. These two components operate alternately according to whether or not the attribute under consideration is involved in a cycle. The procedures embodying the different parts of the approach are presented formally in FIG. 10. Here we describe them informally.

We assume that the input constraint set C is partitioned into two sets: $C_{upper}$, the upper bound constraints, and $C_{lower}$, the lower bound constraints. The upper bound constraints are considered only in the computation of upper bounds for the security levels of attributes (procedure compute_upper_bounds), while lower bound constraints are considered in all phases of the algorithm. The primary task of main is to determine an ordering of the attributes that both identifies cyclic relationships and captures the order in which attributes will be considered when evaluating the classification constraints on them. This ordering reflects possible dependencies between the security levels of the attributes, as specified by the lower bound constraints, and is a total order over sets of attributes. Two attributes whose levels may be mutually dependent are part of a constraint cycle and are considered equivalent in terms of the attribute ordering. Intuitively, the security level of one attribute depends on that of a second attribute if the second is reachable from the first in the constraint graph. For the purpose of determining reachability only, we interpret each edge from a hypernode to a node as a set of edges, one from each attribute in the hypernode to the node. For example, in the constraint lub{λ(division), λ(plan)} λ(doctor) in FIG. 9, we would consider doctor to be reachable from either division or plan. This interpretation reflects the fact that the security levels of either division or plan may depend on the level of doctor. Using this interpretation of reachability, then, attributes involved in cyclic constraints correspond to those in strongly connected components (SCCs)of the constraint graph. Constraint cycles can therefore be identified by applying known methods for identification of SCCs. If we think of each such SCC as a kind of node (or node group) itself, the attribute order we seek is essentially the topological order of the attribute nodes (in the case of acyclic constraints) and SCCs in the constraint graph. Once computed, this order is used to guide the evaluation of both upper and lower bound constraints.

The computation of the attribute ordering is accomplished through an adaptation of known approaches to SCC computation involving two passes of the graph with a depth first search (DFS) traversal of the lower bound constraints. The first pass (dfs_visit) executes a DFS on the graph, recording each attribute in a stack (Stack) as its visit is concluded. The second pass (dfs_back_visit) considers attributes in the order in which they appear in Stack, assigning each to the SCC list scc[max_scc] (where max_see is incremented as each attributed is visited) and marking the attribute as visited. The SCCs are maintained as lists rather than sets so that the attributes within an SCC can be processed in a predictable order in other parts of the algorithm. For each new attribute A popped from Stack, the process walks the graph backward with a (reverse) DFS and adds to the SCC list containing A all attributes it finds still unvisited, since such attributes are necessarily part of the SCC containing A. Each SCC satisfies the following properties: (1) each attribute is a member of exactly one SCC, (2) any two attributes belong to the same SSC if and only if they appear together in a cycle (i.e., are mutually reachable), and (3) the index of the SCC to which any attribute belongs is no greater than that of any attribute reachable from it (i.e., on which it depends). As an example, consider the constraints in FIG. 2.

The execution of main produces the following SCCs:
scc[1]=prescription)
scc[2]=(exam, treatment, visit)
scc[3]=(insurance)
scc[4]=(bill)
scc[5]=(patient)
scc[6]=(employer)
scc[7]=(plan)
scc[8]=(doctor, division, illness)

In addition to finding SCCs, main initializes several variables that are used either during the DFS procedures or in the actual classification process, as follows. For each attribute A, Constr[A] is the set of (lower bound)constraints whose left-hand side includes attribute A, visit[A] is used in the graph traversal to denote if A has been visited, and done[A] is set to TRUE when A becomes definitively labeled. For each security level l∈L, we set done[l]to TRUE, since security levels are constants, and visit[l]to 1, since security levels are leaves in any (lower bound) constraint graph and thus represent terminal points in any traversal of the graph With each constraint c∈$C_{lower}$ we associate a count, count[c], initialized to the number of attributes in the left-hand side of c, and used during the computation of a solution to keep track of the number of attributes remaining to be considered. After initialization and SCC computation, main initializes each attribute's classification to T and concludes by invoking the main constraint solving procedures_ compute_upper_bounds, compute_partial-lubs; and compute_minimal_solution.

Procedure compute_upper_bounds constitutes the process for enforcing upper bound constraints outlined above. The first step directly evaluates each upper bound constraint by assigning to the constrained attribute the greatest lower bound ( )of its current level and the level specified by the constraint. The remainder of the procedure then propagates the enforced upper bounds throughout the (lower bound) constraint graph. This propagation considers each attribute in increasing SCC index order, since the upper bound of some attribute can affect the upper bounds only of attributes of equal or higher XC index, and thus, the number of traversals is minimized. As each attribute is considered, its upper bound is propagated to other attributes, via procedure upper-bound. As upper-bound processes each constraint c on an attribute, it decrements count[c]. The level of the left-hand side is then propagated to the right-hand side only if the count has reached 0, or the attribute on the right-hand side is in the same SCC. Such delayed propagation optimizes the processing of acyclic constraints, since the SCC index of the right-hand side attribute of any acyclic constraint is higher than that of any attribute on the left-hand side. Only after the last attribute in the left-hand side has been processed is it necessary to propagate the level forward.

By considering all attributes in increasing SCC index order, we ensure that all upper bounds are eventually propagated through the graph (or found to violate the consistency requirement). Within a cycle (SCC), each upper bound is propagated (procedure upper_bound) only as far as necessary—the process terminates along any path in which the upper bound is already satisfied. To ensure that all upper bounds are eventually propagated throughout the cycle, procedure compute_upper_bounds calls upper_bound on all unvisited attributes in the cycle. This process guarantees that, even if constraints propagate upper bounds (from attributes of lower SCC index) into a cycle at several points, every upper bound will be propagated as far as necessary. Note that the level assigned to any attribute can always be lowered as much as required by any upper bound propagated into the attribute. Propagation failure can occur only when security levels (leaf nodes) are reached and the incoming upper bound does not dominate the level of the leaf node. Such failure indicates that the upper bound constraint that originated the failed propagation is inconsistent with the lower bound constraints. If compute_upper_bounds completes successfully, we know that the constraints are consistent and that the computation of a minimal solution will be successful (Theorem 5.1). The upper bound constraints need no further consideration.

The purpose of compute_partial_lubs is to precompute the least upper bounds (lubs) of the levels of certain subsets of attributes. These partial lubs are used in procedure minlevel (called by compute_minimal_solution) to compute quickly the lub of the levels of all but one attribute in the left-hand side of an arbitrary constraint. The computation of the partial lubs is designed to take advantage of the fact that attributes in the left-hand side of an acyclic constraint are processed in a predictable order (the SCC index order determined by the DFS procedures). For each lower bound constraint c of the form (lhs, rhs), $|lhs|+2$ partial lubs are computed. At the conclusion of compute_partial_lubs, each partial lub Plub[c][i]f or constraint c is the least upper bound of the levels of all attributes from SCC index 1 up to i. Their use is made clearer in the following discussion.

Procedure compute_minimal_solution integrates the two approaches (back-propagation as set forth above and forward lowering as outlined above) for determining a minimal solution for lower bound constraints. Unlike compute_upper_bounds it considers attributes in decreasing order of SCC index. That is, compute_minimal_solution traverses the constraint graph from the leaves back, rather than from the roots forward. For each attribute A at the SCC index being considered, all constraints in Constr[A] are processed as follows. For each constraint c whose right-hand side is definitively labeled (done[rhs]=TRUE), the procedure determines how to enforce the constraint on A. If c is simple ($|lhs|=1$), the level of the right-hand side is accumulated via the least upper bound ( )operation into variable 1 (initialized to $\bot$). Otherwise, c is complex, and minlevel is called to compute a minimal level that A must dominate (accounting for the current levels of the other attributes on the left-hand side of the constraint) and still satisfy the constraint. Procedure minlevel first computes the least upper bound of the levels of all other attributes (lubothers) by using the precomputed partial lubs. If A is the $j_{th}$ attribute on the left-hand side to be processed, the lub of the other levels is simply the lub of the partial lubs Plub[c][j−1] and Plub[c][j+1]. Next, minlevel computes a minimal level for A that maintains satisfaction of c by descending the lattice along a path from A's current level, one level at a time, stopping at the lowest level found whose direct descendants would all violate the constraint if assigned to A.[1] The returned level is then accumulated into 1. If all the constraints in Constr[A] have the right-hand side done (which is always the case for acyclic constraints), A is simply assigned the level 1 so computed. Intuitively, this corresponds to enforcing back-propagation of security levels.

[1]
In the generally assumed case of compartmented lattices (e. g., FIG. 1(a)) the minimum level to be assigned to A can be computed directly without the need of walking through the lattice. The entire else branch of the minlevel procedure can in fact be substituted with the simple computation, If (lubothers$_l$<rhs$_l$) then last:=(rhs$_l$, rhs$_c$−lubothers$_c$) else last:= ($\bot$, rhs$_c$−lubothers$_c$), where rhs$_l$(lubothers$_l$ resp.) is the classification level of rhs (lubothers resp.) and rhs$_c$ (lubothers$_c$ resp.) the corresponding set of categories.

If, on the other hand, there is at least one constraint on A whose right-hand side is not definitively labeled (done[rhs]= FALSE), then attribute A must be involved in a constraint cycle. In this case, compute_minimal_solution proceeds by performing the forward lowering computation starting from A. At the start of this computation, level 1 represents a lower bound on A's final level. Thus, A must eventually be assigned a level somewhere between its current level (which must be at least as high as 1 if the constraints are consistent) and 1. We know that the constraints are satisfied with A at its current level, so the incremental forward lowering process begins by computing the set of levels (DSet) immediately below $\lambda(A)$ in the lattice. A member 1" of this set is chosen arbitrarily, and try_to_lower checks whether A can be lowered to level 1". Procedure try_to_lower takes an attribute A and a level 1 and returns a set of attribute/level pairs that represent a satisfactory (but possibly non-minimal) assignment of levels to attributes that allows A to be lowered to 1 while maintaining satisfaction of all constraints. If no such assignment exists, try_to_lower returns the empty set to indicate failure. In the event that try_to_lower succeeds, compute_minimal_solution proceeds to enforce all level assignments (in set Lower) returned by try_to_lower. It then continues to attempt lowering the level of A from the most recent point of success. In the event that try_to_lower fails, another level to try is chosen from DSet. If all levels in DSet are tried and fail (DSet=∅), the current level assigned to A is a minimal level for A that maintains satisfaction of all constraints. Note that the condition DSet=∅ must eventually become true, either because all attempts at lowering fail, or because $\bot$ is reached. Note also that when a lowering attempt succeeds for some level in 1"∈DSet, it is not necessary to consider any other level in DSet. That is, a minimal level for A will always be found by considering only levels lower than the level that last succeeded. This point is discussed in more detail in the correctness proof for the algorithm.

The keys to the operation of procedure try_to_lower are the sets Tocheck and Tolower. Tocheck is the set of attribute/level pairs that remain to be checked to determine success or failure of the lowering attempt. Tolower is the set of attribute/level assignment pairs that must ultimately be enforced if the lowering attempt succeeds. In effect, Tocheck represents a set of tentative level assignments that may become definite at some point. Now, for a given call try_to_lower(A, l), Tocheck is initialized to (A, 1)and Tolower to Ø, since it is the attempt to lower the level of A to 1 that must be checked, while no assignments are yet implied by the attempted lowering. The procedure continues as long as there are tentative assignments to check. The checking process amounts to propagating levels forward through the constraint graph, maintaining additional lowerings found to be necessary in set Tocheck, moving them then to set Tolower for their later enforcement, if they do not result in any constraint violation. In the event of a constraint violation try_to_lower fails immediately, returning the empty set. Otherwise, it returns the set Tolower containing the assignments found to be necessary to enable the level of attribute A to be lowered to 1.

Note that in the forward-lowering process, the level propagated forward may change and become either higher or lower because of complex constraints. The level can increase when traversing a complex constraint, because in this case we require only that the right-hand side is dominated by (i.e, lowered to) the level of the lub of all the attributes in the left-hand side. The level can also decrease when, traversing a complex constraint, we would require rhs to be dominated by (lowered to) a level incomparable to its current level or the level recorded for it in either Tocheck or Tolower. In this case, the process can succeed only if the attribute is dominated by both levels, that is, if it can be lowered to their greatest lower bound. We therefore record this tentative lowering (in Tocheck and propagate the level forward.

Once a minimal level has been computed for any attribute A, compute_minimal_solution updates the partial lubs in which λ(A)is involved to keep the partial lubs correct with respect to λ.

FIGS. 11a–11c illustrate the execution of the approach on the constraints of FIG. 2. For the readers convenience, we reproduce the lattice and the set of constraints in FIG. 8(a) and 8b) respectively. Table 8(c) lists attributes in the order in which they are considered and shows how their level (and those of attributes in the same SCC) change as each attribute is processed. An F on the side of a try_to_lower call indicates a failure. Traversing down a lattice is assumed to be performed by considering direct descendants in left-to-right order. The bottom line reports the final (minimal) levels computed. Now, the correctness and complexity of the method in accordance with the invention will be described.

Correctness and Complexity Analysis

In this section, the correctness of the method in accordance with the invention is described and the complexity of the method is described. Proofs of the theorems that appear in this section appear in the Appendix.

Theorem 5.1 (Correctness) Algorithm 3.1 (See FIG. 10) the problem (MIN-LATTICE-ASSIGNMENT). That is, given a set C of classification constraints over a set A of attributes and a security lattice L=(L,), Algorithm 3.1 generates a minimal classification mapping λ: A☐L satisfying C.

Complexity In the complexity analysis we adopt the following notational conventions with respect to a given instance(A, L, C)of MIN-LATTICE-ASSIGNMENT: $N_A$(=|A|)denotes the number of attributes in A; $N_L$(=|L|)denotes the total number of security levels in L; $N_c$ (=|C|)denotes the number of constraints in C; S=$\Sigma_{(lhs,rhs)\epsilon c}(|lhs|+1)$ denotes the total size of all constraints in C; H denotes the height of L; B denotes the maximum number of immediate predecessors ("branching factor") of any element in L; c denotes the maximum cost of computing the least upper bound or greatest lower bound of any two elements in L. Define M to be maximum, for all paths from the top to the bottom of a lattice, of the sum of the branching factor of each element of the path. M is no greater than BH, and is also no greater than the size of L (number of elements+size of the immediate successor relation).

Theorem 5.2 (Complexity) Algorithm 3.1 (See FIG. 10) solves any instance (A, L, C) of the problem MIN-LATTICE-ASSIGNMENT in O($N_A$SHMc) time, and, if the set of constraints C is acyclic, in O(SMc)time. Therefore, MIN-LATTICE-ASSIGNMENT is solvable in polynomial time.

Note, in particular, that the time taken by Algorithm 3.1 is linear in the size of the constraints for acyclic constraints, and no worse than quadratic for cyclic constraints. Whether the complexity for the cyclic case can be improved to linear in the size of the constraints remains an open question. However, the complexity for the cyclic case is truly worst case—it assumes that the entire constraint set forms a single SCC, which rarely occurs in practice. For any instance of the problem, the acyclic complexity analysis applies to all acyclic portions of the constraint set. In Algorithm 3.1 the higher price is paid only for cyclic constraints, which typically include only a small portion of the input constraint set.

The cost of lattice operations An important practical consideration is the efficiency of lattice computations. Recent work has shown that constant-time testing of partial orders can be accomplished through a data structure requiring O($n*n^{1/2}$) space and O($n^2$) time to construct, where n is the number of elements in the poset. Encoding techniques are known that enable near constant-time computation of lubs/glbs, so that c in the above analysis can be taken as constant, at the expense of additional preprocessing time. In practice, one would expect to use the same security lattice over many different instances of MIN-LATTICE-ASSIGNMENT, so that the additional preprocessing cost for lattice encoding is less of a concern. Finally, we note that the generally considered security lattices with access classes represented by pairs classification and a set of categories can be efficiently encoded as bit vectors that enable fast testing of the dominance relation and lub and glb computations. The limited number of levels (16) and categories (64) required by the standard allows the encoding of any security level in a small number of machine words, effectively yielding constant-time lattice operations.

Returning a Preferred Minimal Solution

As noted above, minimal solutions are generally not unique, since complex lower bound constraints can be solved minimally by assigning, if necessary, any one attribute on the left-hand side a sufficiently high level. The approach presented returns one minimal solution, where the particular solution returned depends both on the (fixed) topological order of attribute nodes and cycles that guides the back-propagation of security levels and on the (arbitrary) order in which constraints are evaluated within cycles. Not all minimal solutions to a set of constraints may be considered equal. Some solutions may be preferred over others, for instance because they grant greater visibility (i. e., accessibility to more subjects) on certain selected attributes.

Previous approaches addressing the problem of minimizing information loss while satisfying some upgrading constraints based the choice of the specific solution to be returned on the concept of "optimal" classification. Optimality is expressed as minimization of cost measures determined from the association of weights to attributes and costs to security levels, and where the cost of each solution is the weighted sum of the classifications assigned. Finding such an optimal solution is however an NP-hard problem, and existing approaches typically perform exhaustive examination of all possible solutions. Beside suffering from a general computational intractability, these cost-based approaches are very difficult to use in practice, as it is generally far from obvious how to manipulate costs to achieve the desired classification behavior.

We describe here two ways of specifying preference criteria on the minimal solution to be returned which are intuitive and easy to use. We also illustrate how they can be included in our approach without increasing the computational cost of finding the solution.

Soft upper bound constraints. Soft upper bound constraints are, as their name suggests, upper bound constraints (Definition 2.2), whose satisfaction is not mandatory, rather it is a desiderata on the solution. Intuitively, soft upper bound constraints express visibility requirements that should be satisfied in the solution, if possible. Since not all soft constraints may be simultaneously satisfiable, it is convenient to consider soft constraints ordered according to their importance. We assume a list of soft upper bound constraints is provided as input, where the order in which the constraints appear reflects their importance. Soft upper bound constraints are enforced just after the upper bound constraints provided as part of the problem specification. The process for enforcing soft upper bound constraints is essentially the same as that for enforcing other upper bound constraints. The only difference is in the fact that constraints are considered in a specific order, and that constraints that cannot be satisfied (since they conflict with other upper or lower bound constraints or soft upper bound constraints already enforced) can simply be ignored.

Attribute priority. Another, complementary, approach to specify and compute a preferred solution is the consideration of explicit priorities between attributes, which establish their importance in terms of visibility. The algorithm should then return the minimal solution that avoids penalizing those attributes whose visibility is more important.

To the purpose of considering priorities, we first assume that attributes are prioritized according to a total order o, where A o B implies that the visibility of A is more important than the visibility of B. We then extend this order to classifications as follows. $\lambda$ Definition 6.1 (Lexicographic Order) Given a set A of attributes, security lattice L=(L,), and a total ordering o on the elements of A, a classification $\lambda$: A$\square$L lexicographically dominates (with respect to o) another classification $\lambda'$, denoted $\lambda o \lambda'$, iff $\forall A \epsilon A$: ($\forall A' \epsilon A$, $A' \neq A, A'$o A: $\lambda'(A')=\lambda(A') \Rightarrow \lambda(A) \lambda(A)$. In other words, $\lambda o \lambda'$ iff, for the least attribute A (in the total order o) for which $\lambda$ and $\lambda$ differ, $\lambda(A)$ o$\lambda'(A)$.

Based on the above definition, a classification is said to be priority-minimal if it classifies the attributes whose visibility is more important as low as possible. This concept is made precise by the following definition.

Definition 6.2 (Priority-Minimal Classification) Given a set A of attributes, security lattice L=(L,), a set C of classification constraints over A and L, and a total ordering o on the elements of A, a classification $\lambda$: A$\square$L is priority-minimal with respect to o and C iff (1)$\lambda|$=C; and (2) $\forall\lambda'$: A$\square$L such that $\lambda'|$=C, $\lambda o \lambda' \Rightarrow \lambda'=\lambda$.

It is easy to see that the definition of priority-minimal is stronger than the definition of minimal Definition 2.3) and that any classification that is priority-minimal is also minimal (the converse does not necessarily hold). The proof is trivial by contradiction. Suppose the implication does not hold and consider a classification $\lambda$ that is priority-minimal (with respect to some total order #o on the attributes)but is not minimal. Then, there exists a classification $\lambda' \neq \lambda$ such that $\lambda'|$=C and $\lambda\lambda'$, i.e., $\lambda(A) \lambda'(A)$, $\forall A \epsilon A$. Hence $\lambda o \lambda'$ and $\lambda \neq \lambda'$, which contradicts the assumption that ▓ is priority-minimal.

While the additional control offered by the concept of attribute priority is useful, the assumption of totally ordered attributes is likely too strong as a practical requirement. We can imagine instead that attribute priorities will form a partial order, reflecting the fact that, while some attributes are more important than others in terms of visibility, there may be no relative importance between other attributes. We can also imagine the priority order to be only partially specified (on attributes whose visibility is most important), while all attributes not explicitly mentioned are assumed to have the same priority (at the top of the attribute ordering). For instance, referring to the example in FIG. 2, a priority order specification might say simply that patient o illness, meaning that the solution should guarantee first the maximum visibility of patient, then the maximum visibility of illness, then the visibility of the other attributes (in no particular order).

To account for this general situation, we extend the definition of priority-minimal to allow the given priority ordering on the attributes A to be partial. We say that a total ordering o respects a partial ordering p if for all A, A'$\epsilon$A: ApA'$\Rightarrow$AoA'.

Definition 6.3 (Partial-Priority-Minimal Classification) Given a set A of attributes, security lattice L=(L,), a set C of classification constraints over A and L and a partial ordering p on the elements of A, a classification $\lambda$: A$\square$L is partial-priority-minimal with respect to p and C iff(1) $\lambda|$=C; and (2) $\forall\lambda'$: A$\square$L such that $\lambda'|$=C, ($\forall$ total orders o respecting p, $\lambda o \lambda'$)$\Rightarrow\lambda'=\lambda$.

Definition 6.3 simply extends Definition 6.2 to the case where the ordering on attributes is a partial order. Again, the condition of partial-priority-minimal is stronger than simple minimality and any solution satisfying Definition 6.3 is also a minimal solution. More precisely, it is a minimal solution preferred according to the visibility constraints specified by the given partial order on attributes.

With minor modifications Algorithm 3.1 can be used to compute partial-priority-minimal solutions. Here we sketch how such a modified algorithm would work. The enforcement of upper bound constraints is carried out as in Algorithm 3.1, since their enforcement is deterministic. For lower bound constraints, the algorithm is modified to use the incremental lowering process (forward propagation) on attributes in nondecreasing attribute priority order, as determined by the partial order p. More specifically, for some total order o on the attributes that respects o, the incremental lowering procedure (try_to_lower) is applied successively to each attribute from least to greatest according to o. The level of each attribute is lowered as far as possible before proceeding to the next attribute. In this way, each attribute is assigned the lowest level that satisfies the constraints, subject to the additional constraint that the levels of attributes (lower in attribute priority order) already assigned cannot be modified. We state without proof that the solution so computed is partial-priority-minimal (with respect to p). The time complexity of this computation is the same as that of computing a minimal solution for a set of cyclic constraints (analyzed in the appendix), $O(N_A SHMc)$.

When the priority ordering on attributes is only partially specified (i. e., some subset of the attributes is not prioritized), the performance of the algorithm for computing partial-priority-minimal solutions can be improved by first executing the incremental lowering process as described only on the prioritized attributes. Then, procedure compute_minimal_solution from Algorithm 3.1 can be run unmodified. Intuitively, running the forward propagation approach on the prioritized attributes will set their final levels as low as possible. Then, the algorithm will proceed by executing compute_minimal_solution to determine a classification as before.

Figures 12, 13:
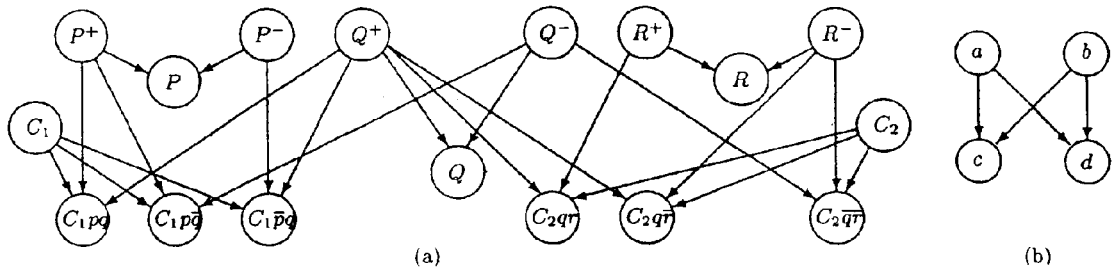
FIG. 12 is a diagram illustrating an example of the computation for a partial-priority-minimal-solution in accordance with the invention.

To illustrate, consider the constraints in FIG. 2 and assume the partial priority order patient p plan, plan p doctor (with no other attributes prioritized). We first enforce the upper bound constraints, setting the highest level of each attribute as indicated in the first line of the table in FIG. 12. We then execute the forward propagation process on the prioritized attributes in increasing priority order. Hence, we try to lower patient one step at a time in the lattice, from its initial level Admin, propagating the constraint forward. All the levels attempted will return success, and patient will be ultimately assigned level Public, causing the highest level that can be assumed by employer to be lowered to Public as well. Next we consider attribute plan, trying to lower it one step at a time from its current level HMO. Again, every attempted level will succeed and plan will ultimately be assigned level Financial, causing the highest level that can be assumed by doctor to be lowered to Admin. Finally, we consider attribute doctor and attempt to lower it, one step at a time in the lattice, from its level Admin, propagating the constraint forward. The process determines Clinical as a lowest level that doctor can assume (the attempt to lower the attribute at level Research fails because of the required lowering of illness, whose least upper bound with patient would not be satisfied anymore). Hence, the level of doctor is determined as Clinical, causing the highest level of illness to Clinical as well. After this process the highest level assigned to patient, plan, and doctor is the lowest level they can assume, assumed the specified priority order, without causing any violations. We can now execute compute_minimal_solution to determine a solution. The classification process and the resulting solution are illustrated in FIG. 12.

Arbitrary Partial Orders

The results presented thus far are based on the assumption of classification levels forming a lattice. We consider here the problem of determining a minimal classification if the security levels do not form a lattice but may instead be an arbitrary poset. It turns out that the problem becomes intractable under this new condition, as the following theorem states.

We define the problem MIN-POSET similarly to MIN-LATTICE-ASSIGNMENT, except that the partial order is not restricted to be a lattice and it is stated as a decision problem. Given a partial order (P,)and a set of constraints C, each constraint taking one of three forms. AA', A 1, lub{$A_1$, ..., $_k$} A, where the As are attributes, and 1 is a constant drawn from P, is there an assignment from attributes to members of P that satisfies all the constraints C, and which is minimal?

Theorem 7.1 Min-Poset is NP-hard.

Proof: The proof is presented in the attached appendix.

In summary, the problem of computing an assignment of security levels to database attributes from a set of classification constraints has been considered. The constraints we consider permit specification of relationships between the security levels of a set of one or more attributes and the level of another attribute or an explicit level. In contrast to previous proposals investigating the NP-hard problem of determining optimal solutions (with respect to some cost measure), we provide an efficient algorithm for computing one solution with (pointwise)minimal information loss. Our approach efficiently handles complex cyclic constraints and guarantees a minimal solution in all cases in quadratic time, but also provides linear time performance for the common case of acyclic constraints.

APPENDIX

A Proofs

A.1 Correctness of Algorithm 3.1

We first establish several lemmas used in the proof of the main theorem. The proofs often refer to immediate constraints on an attribute, by which we mean either lower bound constraints in which the attribute appears on the left-hand side or upper bound constraints in which the attribute is on the right-hand side.

Lemma A.1 establishes the correctness of compute_upper_bounds, showing that it succeeds in generating an initial classification mapping that satisfies the input constraints if and only if the constraints are consistent.

Lemma A.1 Let $C=C_{lower} \cup C_{upper}$ be a set of classification constraints over a set of attributes A and a security lattice $L=(L,)$.

i) If compute_upper_bounds terminates with failure, then C is inconsistent. ≠ ii) If compute_upper_bounds terminates with success, then the computed classification mapping $\lambda$: A□L satisfies C($\lambda$|= C), and hence, C is consistent.

iii) Procedure_compute_upper bounds always terminates.

Proof:

i) We first prove that the following property holds of the current classification mapping $\lambda$ throughout the computation of compute_upper_bounds:

For all mappings $\lambda$' such that $\lambda \to \lambda'$, there exists a constraint c∈C such that $\lambda'|\neq c$. (A.1.1)

In other words, at all times in compute_upper_bounds it is not possible to change the levels of any attributes to higher or incomparable levels without violating at least one constraint. We prove this property by induction, showing that if it holds before the modification of any $\lambda(A)$, it also holds after the change. At the start of the procedure, $\lambda A=T$ for all attributes A, and the property trivially holds, since there is no mapping that A does not dominate. Now, there are two points in compute_upper_bounds at which attributes levels may be modified. The first is at the start of compute_upper_bounds itself, where each upper bound constraint is enforced, and the second is in the subprocedure upper_bound. In both cases, the modification results from a processing a constraint c of the form (lhs, A), where A□A, and the level assigned to A is the greatest lower bound (glb)of the level of lhs and $\lambda(A)$. Let l denote the level of lhs under $\lambda$, and let 11'=1Π$\lambda(A)$. Let $\lambda A'=\lambda$ except that A'(A)=1'. Note that $\lambda$' is the mapping that results from ensuring the satisfaction of c. We analyze three cases according to the possible relationships between l and $\lambda(A)$.

Case 1: 1 $\lambda(A)$. In this case, l'=l and $\lambda'=\lambda$. Hence, $\lambda$ is not modified, and the property continues to hold.

Case 2: $\lambda(A)$ 1. We thus have $\lambda'(A)=1$. Let $\lambda$" be any mapping such that $\lambda'\lambda$". If $\lambda'(A) \lambda"(A)$, then $l \to \lambda"(A)$, and $\lambda"|\neq c$. Hence, the property holds for the modified mapping $\lambda'$. Otherwise, $\lambda'(A) □\lambda"(A)$, and for some A'≠A, $\lambda'(A') \lambda"(A')$. Since $\lambda'=\lambda$ except on A, we have $\lambda'(A')=\lambda(A')$, $\lambda(A')$ $\lambda''(A')$, and hence, $\lambda\lambda''$. By hypothesis, then, there exists c'∈C such that $\lambda''|\neq c'$, and the property again holds for the modified mapping $\lambda'$.

Case 3: $\lambda(A)$ and l are incomparable. Again let $\lambda''$ be any mapping such that $\lambda\lambda''$. Suppose $\lambda'(A)$ $\lambda''(A)$. If $\lambda(A)$ $\lambda''(A)$, then l $\lambda''(A)$, since $\lambda'(A)$=l' is the glb of l and $\lambda(A)$. Hence, $\lambda''|\neq c$. Otherwise, $\lambda(A)$ $\lambda''(A)$. Hence, $\lambda\lambda''$, and by hypothesis, there exists c'∈C such that $\lambda''|\neq c'$. In either case, the property holds for the modified mapping $\lambda'$. Suppose instead that $\lambda'(A)$ $\lambda''(A)$. Then, for some $A'\neq A$, $\lambda'(A')$, $\lambda''(A')$. Since $\lambda'=\lambda$ except on A, we have $\lambda'(A')=\lambda(A')$, $\lambda(A')$ $\lambda''(A')$, and hence, $\lambda\lambda''$. By hypothesis, then, there exists c'∈C such that $\lambda''|\neq c'$, and the property again holds for the modified mapping $\lambda'$.

Suppose now that upper_bound (and hence, compute_upper_bounds) terminates with failure. This means that a constraint c=(lhs, rhs), such that rhs ∈L is a security level, was found not to be satisfied; that is, $\lambda|\neq c$. Since rhs is fixed, the only way to satisfy the constraint would be to suitably modify $\lambda$ for some attribute(s) in lhs. Let 1': A L be any mapping from attributes in A to levels in L. If $\lambda\lambda'$, then $\lambda'|\neq c$, since $\lambda|\neq c$. Otherwise, $\lambda\lambda'$. By the property just proved (A.1.1), there exists a constraint c'∈C such that $\lambda'|\neq c$. Hence, for any mapping $\lambda'$, there exists a constraint that cannot be satisfied, and therefore C is inconsistent.

ii) Assume that compute_upper_bounds terminates successfully. We show that the computed mapping $\lambda$ satisfies C by induction on SCC index. That is, we show that, if at the start of iteration i (of the loop over SCCs in compute_upper_bounds) $\lambda$ satisfies all immediate constraints on all attributes in all SCCs of index less than i, then at the end of that iteration $\lambda$ satisfies all immediate constraints on all attributes in all SCCs of index less than or equal to i.

We begin by noting that before the first iteration (i=1), $\lambda|=C_{upper}$, since for each constraint c∈$C_{upper}$ of the form (l,A), $\lambda(A)$ is assigned $\lambda(A)$ 1, so that 1 $\lambda(A)$. Now consider an arbitrary iteration i. The following properties are readily established:

1. Every constraint on every attribute in scc[i] is checked for satisfaction under $\lambda$. This follows from the fact that compute_upper_bounds calls upper_bound on all attributes A for which visit[A] is 0, and visit[A] is set to a nonzero value only by upper_bound itself.
2. For any constraint c of the form (lhs, rhs) (on the attribute A being processed) found to be violated by $\lambda$, $\lambda$(rhs) is assigned the glb of its current level and that of lhs, satisfying c. Furthermore, any other constraint with the same rhs remains satisfied, if it was previously, since the new level of rhs is dominated by its previous level. Now, from the properties of the DFS procedures, we know that the SCC index of rhs must be greater than or equal to that of A. If it is equal, a recursive call to upper_bound on rhs ensures that all immediate constraints on it are (re)checked.
3. From the properties of the SCCs computed by the DFS procedures, we know that the levels of any attributes in an SCC of index less than i are unmodified after iteration i, since such attributes are not reachable by any constraints on attributes in scc[i].
4. Since the levels assigned to attributes can only be lowered, the upper bound constraints remain satisfied.

From properties 1, 2, and 4, we can conclude that all immediate constraints on all attributes in scc[i] are satisfied after iteration i. From properties 3 and 4, we can conclude that all constraints on all attributes in SCCs of index less than i remain satisfied Hence, the induction step is proved.

iii) Procedure compute upper bounds is composed of three loops over finite sets. Termination of the procedure is straightforward to establish, except perhaps for the recursive subprocedure upper_bound, called in the third loop, for each SCC scc[i]. upper_bound (A, i) is called recursively only when an attribute A in the SCC being processed (scc[i]) is assigned a level strictly lower than the one it currently has. Each attribute can be lowered only a finite number of times (bounded by the height of the lattice), and the number of attributes in each SCC is finite. Hence, the number of times upper_bound can be called in an SCC is finite.

Lemma A.1 shows that, if the algorithm continues beyond the end of compute_upper_bounds, then the remainder of the algorithm starts from a point at which $\lambda$ satisfies the constraints (and otherwise the constraints are inconsistent). The remaining lemmas are used in the proof of the main theorem to show that key parts of the final phase of the algorithm (compute minimal solution) preserve the property that, after every modification, $\lambda$ remains a solution. First, we prove Lemma A.2, which shows that arguments about the satisfaction of generated classification assignments can be made locally. That is, it establishes that, if any changes to a solution mapping that are limited to a subset of the attributes result in satisfaction of the immediate constraints on those attributes, then the modified mapping remains a solution for all constraints.

Lemma A.2 Given (1) a set C of constraints on a set A of attributes and (2) a subset A' of A, let $\lambda$ be an assignment of levels to attributes such that $\lambda|=C$ and $\lambda'$ be an assignment such that $\lambda\square\lambda'$ and that differs from $\lambda$ only on attributes in A'. Let C' denote the set of immediate constraints on attributes in A', that is, C'={(lhs, rhs)∈C|lhs$\square$A'$\neq\emptyset$). Then, $\lambda'|=C$ if and only if $\lambda'|=C'$.

Proof:

(If): Assume that $\lambda'$ satisfies C'. Let c=(lhs, rhs) be an arbitrary constraint in C. If c C', then by assumption, $\lambda'|=c$. Otherwise, c C', so lhs $\square$A'=$\emptyset$, and thus, lub{$\lambda'$(lhs)}=lub{$\lambda$(lhs)}. Now, $\lambda$(rhs) $\lambda'$(rhs) and lub {$\lambda'$(lhs)}=lub{$\lambda$(lhs)} $\lambda$(rhs) $\lambda'$(rhs), and hence, $\lambda'|=c$.

(Only if): If $\lambda'$ satisfies C, $\lambda'$ satisfies any subset of C.

The following lemma shows that any change to A solution A resulting from the output of procedure try-to-lower in Algorithm 3.1 preserves $\lambda$ as A solution.

Lemma A.3 Let AS be the set of pairs of the form ($\lambda'$, 1') returned by Try(A, 1). If AS$\neq\emptyset$ the assignment obtained by replacing $\lambda(A')$ with $\lambda(A')$=1' for all (A', 1')∈ AS satisfies all immediate lower bound constraints on attributes in scc[i], where scc[i] is the SCC containing A.

Proof: The following properties are readily established.

1. When A pair (A', 1')∈ Tocheck is selected, all immediate lower bound constraints on A' are checked for satisfaction.
2. If any constraint c of the form (lhs, rhs) is found to be violated, either the right-hand side is done and cannot be satisfied (in which case try-to-lower returns 0) or A pair of the form (rhs, l'') is added to Tocheck, where l is the greatest level that can be assigned to rhs and still satisfy all constraints checked up to that point.
3. From the established properties of the DFS procedures [29], we know that every attribute A' in the SCC containing A is reachable from A'.
4. For any attribute A', at most one pair of the form (A', l') can exist in Tocheck or Tolower (but not both) at any time. This follows immediately from the fact that, whenever A pair involving A' is added to one set, any pair involving A' in the other set (if one exists) is first removed.

5. For any pair of the form (A', l')∈ Tocheck and any pair of the form (A', 1") subsequently added to Tocheck, l' 1".

6. Every pair (A', 1')∈ Tocheck is eventually selected. This follows from properties 5 and 6.

Properties 1, 2, and 3, and 6 together show that any constraint that could be violated by any assignment modification (represented in Tolower) is checked, and if possible, another modification is made to satisfy the constraint. Properties 1 through 4 together show that, at all times in try_to_lower the modifications to λ represented in Tolower are such that λ' satisfies all immediate constraints on all attributes in the SCC containing A, provided that all pairs in Tocheck also represent satisfying assignments. At the end of the procedure, Tocheck is empty, so the lemma holds.

Theorem 5.1 (Correctness) Algorithm 3.1 solves MIN-LATTICE-ASSIGNMENT. That is, given A set C of classification constraints over A set A of attributes and A security lattice L=(L,), Algorithm 3.1 generates A minimal classification mapping λ: A|→L that satisfies C, or terminates with failure if the set C is inconsistent.

Proof:

We show that compute_minimal_solution produces an assignment λ that (i) satisfies C if one exists (ii) any attribute A for which done[A]=TRUE has been assigned A minimal level that satisfies its constraints. We show this by induction on the outermost loop of compute_minimal_solution on SCCs. Initially λ assigns T to every attribute, which trivially satisfies all lower bound constraints in C, and for every l∈L we have the assignments λ(l)=1 and done[l]_=TRUE, which trivially satisfies the minimality requirement.

By Lemma A.1, compute_upper_bounds always terminates and returns failure if the constraints are inconsistent, otherwise producing an assignment which satisfies C (but which is usually not minimal). Inductively, we assume that at the start of an iteration of the outermost loop λ is A solution, and that any attribute marked done has been assigned A minimal satisfying level, and we must show that λ is A solution at the end of that iteration, and any attribute marked done at the end of that iteration has been assigned A minimal satisfying level. By Lemma A.2 it suffices to show that (1) λ at the end of any iteration differs from λ at the start only on attributes of A given SCC, (2) the level assigned by λ to any attribute is never raised, and (3) all direct constraints on attributes of that SCC are satisfied at the end of any iteration.

Let i be the SCC index in the outermost loop of compute_minimal_solution and S be the list scc[i]. We argue by induction on the second-level loop (For A∈scc[i]), and show that λ satisfies C at the end of each iteration of this inner loop, and further that the minimality requirement is met for all attributes that are done. Let A be an arbitrary attribute in S. Consider Constr[A]. If every (lhs, rhs) E Constr[A] is such that done[rhs]=TRUE, we simply take the least upper bound of A set of predetermined levels, and since we are working in A lattice, A unique least upper bound 1 exists. Otherwise, there is at least one (lhs, rhs) E Constr[A] such that done[rhs]=FALSE. So, after processing each c∈Constr [A], done[A]=FALSE, and we proceed from the initialization of DSet. At this point in the computation 1 holds A lower bound on the level that may be assigned to A, λ(A)l, and DSet is initialized to the set, of levels immediately below λ(A) and that dominate 1. We argue that λ satisfies C at the end of any iteration of the inner while-loop, and that, the minimality requirement is met. If try_to_lower fails for every 1"∈E DSet, no assignments in λ are modified, and thus, C remains satisfied, and since all lower levels failed, we have found a minimal assignment for A. Otherwise, by Lemma A.3, try_to_lower returns A set of pairs of the form (A', 1'), where A'∈scc[i], λ(A') 1', and such that replacing λ(A')by λ(A')=1' for all such A' satisfies all constraints on attributes in scc[i]. The inner while-loop concludes by making this replacement and resetting DSet to levels immediately below λ(A). Hence, λ satisfies C at the end of each iteration of the while-loop, and any attribute A for which done[A]TRUE has been assigned A minimal level that satisfies its constraints. By induction λ satisfies C at the end of the enclosing for-loop, and thus at the end of the outermost loop.

Termination There are two aspects of termination that are not obvious once one takes into consideration the termination argument in Lemma A.1. First, the while-loop at the end of compute_minimal_solution terminates because DSet is finite, and in each iteration every level in DSet is strictly dominated by any level in the preceding iteration. Thus, as long as try_to_lower terminates, the while-loop will terminate, because either the bottom of the lattice is reached or because every level tried in one iteration fails. Second, it is not immediately obvious that the repeat-loop in try_to_lower terminates. Note that it continues as long as the set Tocheck is not empty. In each iteration of the loop one pair is removed from Tocheck and added to Tolower. However, for any attribute, there can be at most one pair involving that attribute in either Tocheck or Tolower. It is possible that, for some pair (A, 1)∈ Tolower, A pair (A, 1') will be added to Tocheck. If so, l must strictly dominate l", so the number of times A pair involving the same attribute may be entered into Tocheck is bounded by the height of the lattice.

A.2 Complexity Analysis

In the complexity analysis we adopt the following notational conventions with respect to A given instance (A, L, C) of MIN-LATTICE-ASSIGNMENT: $N_A(=|A|)$ denotes the number of attributes in A; $N_L(=|L|)$ denotes the number of security levels in L; $N_C(=|C|)$ denotes the number of constraints in C; $S=\Sigma_{(lhs,rhd)^\epsilon C}(|lhs|+1)$ denotes the total size of all constraints in C; H denotes the height of L; B denotes the maximum number of immediate predecessors ("branching factor") of any element, in L; c denotes the maximum cost of computing the lub or glb of any two elements in L. Define M to be maximum, for all paths from the top to the bottom of A lattice, of the sum of the branching factor of each element of the path. M is no greater than BH, and is also no greater than the size of L (number of elements+size of the immediate successor relation).

Theorem 5.2 (Complexity) Algorithm 3.1 solves any instance (A, L, C) of the problem MIN-LATTICE-ASSIGNMENT in $O(N_A SHMc)$ time, and, if the set of constraints C is acyclic, in O(SMc) time. Therefore, MIN-LATTICE -ASSIGNMENT is solvable in polynomial time.

Proof: For the analysis, we consider two cases: (1) C is acyclic, and (2) C is cyclic. We begin by noting that the preprocessing steps in main, apart from dfs_visit and dfs_back_visit, require (in total) time proportional to $S+N_L$. Procedures dfs_visit and dfs_back_visit themselves are simply A minor adaptation of Taijan's linear-time SCC computing algorithm [29], and require time proportional to S. In the acyclic case, compute_upper_bounds processes all constraints in C once for each attribute on the left-hand side, and, for each constraint, may perform one lub and one glb operation. Thus, it requires time proportional to $S+N_c c$, which is certainly O(Sc). In the cyclic case, compute_upper_bounds may check all constraints in C multiple times per attribute. Whenever the level of the attribute A on the right side of some constraint is lowered and is in the same SCC as the attribute on the left side for which the constraint is being checked, all constraints on A must be rechecked. Since this rechecking is done only upon lowering the level of the attribute, the number of times an attribute's constraints can be rechecked is bounded by H, the height of the lattice. Thus, in the cyclic case the enforcement of upper bound constraints can be accomplished in O(SHc)time. Overall, the time complexity for all parts of the algorithm before compute_minimal_solution is O(Sc) in the acyclic case and O(SHc) in the cyclic case.

It remains to determine the complexity of compute-partial-lubs and compute_minimal_solution. For each constraint (lhs, rhs, compute_partial_lubs computes and stores A number of partial lubs requiring O(|Lhs|) space and O(|Lhs|c) time. Overall, the time complexity of compute_partial_lubs is O(Sc).

For compute_minimal_solution note that the effect of the three nested for-loops is to consider every attribute in each of its constraints, which requires no more than S iterations of the innermost loop, while the containing loop iterates $N_A$ times overall. In the acyclic case, note that every attribute is its own SCC. When considering any attribute A in compute_minimal_solution, then, the computation of the level of any attribute appearing on the rhs of any constraint on A will have been completed (done[rhs] is always true), and the DSet computation and while-loop are never performed. Thus, apart from constant-time initializations in the second for-loop, the only cost to consider for the acyclic case is that of the innermost for-loop. For each constraint, either A lub operation is performed, or possibly A lub operation and A call to minlevel. The minlevel procedure first performs several constant-time initializations and one lub operation. The remainder of minlevel considers overall at most M security levels, each involving a lub operation. The time complexity of minlevel, then, is O(Mc). Since the cost of minlevel is at least as high as that of a lub operation, the worst-case cost of the inner loop is when all S iterations involve minlevel, O(SMc), which, for acyclic constraints, dominates the time complexity of all other parts of the algorithm.

For cyclic constraints, the cost due to the innermost for-loop of compute_minimal_solution cannot be greater than that of the acyclic case. In the containing loop (the loop over attributes), the while-loop may execute for every attribute in the SCC. Like minlevel, the while-loop considers at most HB security levels, each involving the try_to_lower computation. In the worst case, try_to_lower processes the constraints for all attributes in the SCC. More precisely, it processes the constraints of every attribute in the SCC not marked done. The number of such attributes decreases by one after each invocation of try_to_lower, but on average, try_to_lower may process as many as half the constraints involved in the SCC. Now, it can happen that, for some pair (A, l)∈ Tolower and level l', (A, 1) is removed from Tolower and (A, 1') added to Tocheck, implying the reprocessing of constraints on A. For any attribute, this reintroduction into Tocheck can happen at most H times, since l' must be strictly lower than 1. For each constraint considered, the lub of all attributes in the lhs is computed, requiring time proportional to |lhs|.c. Assuming suitable data structures for constant-time operations involving Tolower and Tocheck, the only remaining nonconstant cost comes from at most two glb operations. The time complexity of try_to_lower, then, is O(HSc), and that of the while-loop in compute_minimal_solution is O(HMSc). Over all attributes in the SCC, the time complexity of compute_minimal_solution due to the while-loop is O($N_A$HMSc), which dominates the cost due to the innermost for-loop of compute_minimal_solution.

A.3 Minimal Assignment in A POset

We define the problem MIN-POSET similarly to MIN-LATTICE-ASSIGNMENT, except that the partial order is not restricted to be a lattice and it is stated as a decision problem. Given a partial order (P,) and a set of constraints C, each constraint taking one of three forms: A A', A 1, lub{$A_1$, . . . , $A_k$} A, where the As are attributes, and 1 is a constant drawn from P, is there an assignment from attributes to members of P that satisfies all the constraints C, and which is minimal?

Theorem 7.1 [MIN-POset is NP-hard.]

Informally, to see why MIN-POSET is a hard problem, consider a poset of security levels with four elements with two upper elements each dominating the two lower elements, as depicted in FIG. 13(b). If an attribute is known to dominate the second two elements, in the final analysis that attribute must be assigned to one of the first two elements, and thus a choice must be made. Multiple such choices may result in an exponential number of possibilities. Below we sketch a proof using this kind of choice to encode propositional truth or falsity in satisfiability problems.

We give a reduction from 3-SAT, demonstrating NP-hardness. We first define a partial order (the security levels), beginning with the empty set C, and for each clause $Clause_i = P_{i1} P_{i2} P_{i3}$ we add the element named $C_i$ to C, and further add seven more elements to C, one for each truth assignment which satisfies the clause. For convenience, we name these seven elements by simply concatenating the names of the clauses with the names of the variables they contain, using overbars to denote negation: "$C_i P_{i1} P_{i2} P_{i3}$", "$C_i P_{i1} P_{i2}, \overline{P_{i3}}$", "$C_i P_{i1} \overline{P_{i2}} P_{i3}$", etc. For each propositional variable $P_j$, we add three elements to C, named "$P_j$", "$P_j^+$", and "$P_j^-$". Intuitively, these stand for the j-th proposition being undecided, true, and false, respectively.

With the above set of constants, we define a partial order relation on them as follows. We define the relation $R_{prop}$ to include, for each proposition $P_i$, $P_i^+ \geq P_i$ and $P_i^- \geq P_i$. We define the relation $R_{clause}$ to include, for each clause $Clause_1 = P_{i1} P_{i2} P_{i3}$ occurring in the 3-SAT problem, and each truth assignment which satisfies the clause, $C_i$ $C_i P_{i1} P_{i2} P_{i3}$. We also define the relation $R_{true}$ to include, for each clause $Clausei = P_{i1} P_{i2} P_{i3}$, and each proposition in that clause $P_{ij}$, a relation $P_{ij}^+ C_i P_{i1} P_{i2} P_{i3}$ for each of the three or four clause elements which correspond to $P_{ij}$ being true. Similarly, we define the relation $R_{false}$ to include, for each clause $Clause_i = P_{i1} P_{i2} P_{i3}$, and each proposition in that clause $P_{ij}$, a relation $P_j^- C_i P_{i1} P_{i2} P_{i3}$. for each of the three or four clause types which correspond to $P_{ij}$ being false. The final partial order of interest will be made up of elements of C, related by $R_{prop} R_{clause} R_{true} R^{false}$. The partial order has height one, and contains eight ($=2^3$) elements for each 3-SAT clause, plus three elements for each proposition. FIG. 13(a) displays the partial order produced for the SAT problem (P Q) (Q —R). Clauses of length two were used in the figure to improve readability.

We use A set of attributes, one $wp_j$ and one $wu_j$ for each proposition $P_j$, and one $wc_j$, for each clause $Clause_j$. We define A set of inequations $C_{clause}$ to include, for each clause $Clause_i = P_{i1} P_{i2} P_{i3}$, the constraint $C_1 > wc_i$, and for each proposition $P_{ij}$ in that clause, $wp_{ij} wc_i$. We also define A set of inequations $C_{prop}$ to include, for each proposition $P_i$, $wu_i$ $wp_i$ and $wu_i$ $P_i$. Thus there are four constraints in $C_{clause}$ per 3-SAT clause, and two constraints in $C_{prop}$ for each proposition. Continuing with our simple example, (P Q) (Q —R), the inequations $C_{clause} = \{C_l \text{ wc}_1, wp_p \text{ wc}_l, wp_q \text{ wc}_1, C_2 \text{ wc}_2,$ wq $wp_q$, $wp_r$ —$wc_2$}, and $C_{prop}$={$wu_p$ $wp_p$, $wu_q$ $wp_q$, $wu_r$ $wp_r$, $wu_p$ P, $wu_q$ Q, $wu_r$ R}.

We claim that the MIN-POSET problem given by the partial order (C, $R_{prop}$ $R_{clause}$ $R_{true}$ $R_{false}$), with the constraints $C_{prop}$ $C_{clause}$ has A minimal solution if and only if the original 3-SAT problem has one. This may be observed by noting that every attribute $wc_i$ must be assigned some $C_i P_{i1} P_{i2} P_{i3}$, since $wc_i$ must be lower than $C_i$ and some propositions. Also, the only $C_i P_{i1} P_{i2} P_{i3}$ which exist in C correspond to assignments of propositions which satisfy the clause. Further, $wu_j$ must be assigned $P_i$, and $wp_j$ must be assigned either $P_j^+$ or $P_j^-$. We claim there is a correspondence between a proposition $P_j$ being assigned true (or false, resp.) in the 3-SAT problem, and $w_j$ being assigned $Pj^+(Pj^-$:, resp.) in the MIN-POSET problem. Thus one may see that a solution to the 3-SAT problem may be derived from any solution to the constructed MIN-POSET problem and vice versa.

Using results of Pratt and Tiuryn, this NP-hardness result can be improved to apply to small fixed partial orders; including the four-element partial order of security levels with two upper elements each dominating the two lower elements (FIG. 10(b)).

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. A method for assigning a partially ordered set of classification levels to a set of data attributes, comprising:
    (a) providing at least one simple constraint imposing a classification level boundary for an associated attribute;
    (b) providing at least one complex constraint imposing another classification level boundary relating collectively to an associated collection of attributes; and
    (c) assigning the classification levels to the attributes in a manner that satisfies the simple constraints and the complex constraints and avoids overclassifying the attributes, and
    wherein the assigning is done by use of a computer system according to an automatic algorithm having a complexity no greater than polynomial with respect to a size of the constraints and of the partially ordered set.

2. The method of claim 1, wherein at least one of the classification level boundary and the another classification level boundary represents an upper bound.

3. The method of claim 1, wherein at least one of the classification level boundary and the another classification level boundary represents a lower bound.

4. The method of claim 1, wherein at least one of the classification level boundary and the another classification level boundary specifies a particular classification level as a boundary.

5. The method of claim 1, wherein at least one of the classification level boundary and the another classification level boundary is specified in terms of a classification level to be assigned to one of the attributes.

6. The method of claim 1, wherein the at least one complex constraint imposes a lower bound on the least upper bound of the levels assigned to the associated collection of attributes.

7. The method of claim 1, wherein the at least one complex constraint requires that at least one of the classification levels assigned to the associated collection of attributes is greater than a lower bound.

8. The method of claim 1, wherein the at least one complex constraint comprises a constraint selected from the group of (inference constraints, association constraints, and integrity constraints}.

9. The method of claim 1, wherein the partially ordered set is a fully ordered set.

10. The method of claim 1, wherein the method is used to implement an information security policy.

11. The method of claim 1, wherein the method is used to implement a database confidentiality policy.

12. The method of claim 1, further including providing one or more soft constraints whose satisfaction is not mandatory, and wherein assigning the classification levels to the attributes includes selecting among a plurality of possible assignments based at least partly upon satisfaction of the soft constraints.

13. The method of claim 1, further including checking the simple constraints and the complex constraints for consistency.

14. The method of claim 1, wherein assigning the classification levels to the attributes is done in a manner that does not overclassify any of the attributes.

15. The method of claim 1, wherein assigning the classification levels to the attributes is done in a manner that avoids overclassifying the attributes to a desired extent.

16. The method of claim 1, wherein the complexity of the automatic algorithm is no greater than quadratic with respect to a size of the constraints and of the partially ordered set of levels.

17. The method of claim 1, wherein the simple constraints and the complex constraints include one or more acyclic constraints, and the method further includes directly assigning to the attribute associated with each of the acyclic constraints the lowest classification level that satisfies the acyclic constraint.

18. The method of claim 1, wherein the simple constraints and the complex constraints are acyclic, and the complexity of the automatic algorithm is no greater than linear with respect to a size of the acyclic constraints and of the partially ordered set of levels.

19. A method for assigning a partially ordered set of levels to a set of objects, comprising:
    (a) providing at least one simple constraint imposing a level boundary for an associated object;
    (b) providing at least one complex constraint imposing another level boundary relating collectively to an associated collection of objects; and
    (c) assigning the levels to the objects in a manner that satisfies the simple constraints and the complex constraints and avoids overclassifying the objects, and
    wherein the assigning is done by use of a computer system according to an automatic algorithm having a complexity no greater than polynomial with respect to a size of the constraints and of the partially ordered set.

20. An apparatus for assigning a partially ordered set of levels to a set of objects, comprising:
    (a) means for representing at least one simple constraint imposing a level boundary for an associated object;
    (b) means for representing at least one complex constraint imposing another level boundary relating collectively to an associated collection of objects; and
    (c) means for assigning the levels to the objects by use of a computer system in a manner that satisfies the simple constraints and the complex constraints and avoids overclassifying the objects, and further being operable to perform the assigning according to an automatic algorithm having a complexity no greater than polynomial with respect to a size of the constraints and of the partially ordered set.

21. The method of claim 20, wherein the initial classification is found by assigning the highest classification level from the partially ordered set to each attribute and iteratively lowering the levels as required to satisfy all upper bound constraints.

22. A method for assigning access classification levels from a partially ordered set to a plurality of data attributes, comprising
  (a) providing one or more upper bound constraints each imposing an upper bound on the classification level to be assigned to an associated data attribute;
  (b) providing one or more lower bound constraints each imposing a lower bound relating collectively to the classification levels to be assigned to an associated collection of the data attributes;
  (c) determining an initial assignment of classification levels that satisfies the upper bound and lower bound constraints by use of a computer system; and
  (d) iteratively decrementing the levels assigned to each attribute while continuing to satisfy all of the provided constraints by use of the computer system, thereby tending to decrease the overclassification of attributes and to increase data availability.

23. The method of claim 21, wherein the initial classification is found by assigning the lowest classification level from the partially ordered set to each attribute and increasing their levels until a classification that satisfies all constraints is found.

24. A method for determining a minimal security classification for one or more attributes in a data set, comprising:
  generating a constraint graph by use of a computer system, the constraint graph having nodes with different security levels and nodes with different attributes, the security level nodes and the attribute nodes being connected together to form a lattice;
  enforcing one or more upper bound security constraints by use of the computer system wherein the upper bound constraint corresponds to the maximum security classification for the attribute to permit access to the attribute by as many people as possible;
  providing one or more lower bound constraints that protect the attribute from association and inference attacks; and
  determining a minimal security classification for the attribute by use of the computer system based on the upper bound constraint and the one or more lower bound constraints so that the attribute is resistant to association and inference attacks yet accessible to many people as possible.

25. The method of claim 24, wherein enforcing the upper bound security constraint further comprises propagating the upper bound constraint from the security node corresponding to the upper bound constraint through each attribute node of the constraint graph, determining, at each attribute node, if the security level of the attribute node dominates that propagated security level and lowering the security level of the attribute node to below the propagated security level if the propagated security level does not dominate the security level of the attribute node and the other constraints on the attribute node are not violated.

26. The method of claim 24, wherein determining the minimal security classification further comprises determining if the lower bound constraint is a cyclic constraint or an acyclic constraint, the cyclic constraints being resolved using a cyclic solving process and the acyclic constraints being resolves using an acyclic solving process wherein the cyclic constraint has a loop in the constraint graph.

27. The method of claim 26, wherein the acyclic solving process further comprises determining if the acyclic constraint is simple or complex, the simple acyclic constraint having no hypernodes in the constraint graph and the complex acyclic constraint having one or more hypernodes containing two or more attributes.

28. The method of claim 27, wherein solving for the simple acyclic constraint further comprises propagating the security levels in the constraint graph associated with the lower bound constraints to the attributes nodes to determine the minimal security classification for each attribute node.

29. The method of claim 28, wherein solving the complex acyclic constraint further comprises upgrading the security level associated with the attributes in the hypernode of the constraint graph.

30. The method of claim 26, wherein the cyclic solving process further comprises determining if the cyclic constraint is simple or complex, the simple cyclic constraint having no hypernode in the constraint graph and the complex cyclic constraint having one or more hypernodes containing two or more attributes.

31. The method of claim 30, wherein solving the simple cyclic constraint further comprises assigning the same security level to the attribute nodes contained in the simple cycle.

32. The method of claim 30, wherein solving the complex cyclic constraint further comprises assigning the highest security level to each attribute in the complex cyclic constraint, lowering the security level of a selected attribute in the complex cyclic constraint and lowering the security level of another attribute if the lowering of the selected attribute did not violate any constraints.

33. The method of claim 32, wherein solving the complex cyclic constraint further comprises propagating the security levels in the constraint graph associated with the lower bound constraints to the attributes nodes to determine the minimal security classification for each attribute node.

34. A system for determining a minimal security classification for one or more attributes in a data set, comprising:
  means for generating a constraint graph, the constraint graph having nodes with different security levels and nodes with different attributes, the security level nodes and the attribute nodes being connected together to form a lattice;
  means for enforcing one or more upper bound security constraints by use of a computer system wherein the upper bound constraint corresponds to the maximum security classification for the attribute to permit access to the attribute by as many people as possible;
  means for providing one or more lower bound constraints that protect the attribute from association and inference attacks; and
  means for determining a minimal security classification for the attribute by use of the computer system based on the upper bound constraint and the one or more lower bound constraints so that the attribute is resistant to association and inference attacks yet accessible to many people as possible.

35. The system of claim 34, wherein the enforcing means further comprises means for propagating the upper bound constraint from the security node corresponding to the upper bound constraint through each attribute node of the constraint graph, means for determining, at each attribute node, if the security level of the attribute node dominates that propagated security level and means for lowering the security level of the attribute node to below the propagated security level if the propagated security level does not dominate the security level of the attribute node and the other constraints on the attribute node are not violated.

36. The system of claim 34, wherein the means for determining the minimal security classification further comprises means for determining if the lower bound constraint is a cyclic constraint or an acyclic constraint, the cyclic constraints being resolved using a cyclic solving means and the acyclic constraints being resolves using an acyclic solving means wherein the cyclic constraint has a loop in the constraint graph.

37. The system of claim 36, wherein the acyclic solving means further comprises means for determining if the acyclic constraint is simple or complex, the simple acyclic constraint having no hypernodes in the constraint graph and the complex acyclic constraint having one or more hypernodes containing two or more attributes.

38. The system of claim 37, wherein means for solving for the simple acyclic constraint further comprises means for propagating the security levels in the constraint graph associated with the lower bound constraints to the attributes nodes to determine the minimal security classification for each attribute node.

39. The system of claim 38, wherein means for solving the complex acyclic constraint further comprises means for upgrading the security level associated with the attributes in the hypernode of the constraint graph.

40. The system of claim 36, wherein the cyclic solving means further comprises means for determining if the cyclic constraint is simple or complex, the simple cyclic constraint having no hypernode in the constraint graph and the complex cyclic constraint having one or more hypernodes containing two or more attributes.

41. The system of claim 40, wherein means for solving the simple cyclic constraint further comprises means for assigning the same security level to the attribute nodes contained in the simple cycle.

42. The system of claim 40, wherein means for solving the complex cyclic constraint further comprises means for assigning the highest security level to each attribute in the complex cyclic constraint, means for lowering the security level of a selected attribute in the complex cyclic constraint and means for lowering the security level of another attribute if the lowering of the selected attribute did not violate any constraints.

43. The system of claim 42, wherein means for solving the complex cyclic constraint further comprises means for propagating the security levels in the constraint graph associated with the lower bound constraints to the attributes nodes to determine the minimal security classification for each attribute node.

* * * * *